(12) United States Patent
Hattori et al.

(10) Patent No.: US 8,117,345 B2
(45) Date of Patent: Feb. 14, 2012

(54) SIGNAL PROCESSING DEVICE AND METHOD, PROGRAM, AND SIGNAL PROCESSING SYSTEM

(75) Inventors: Masaaki Hattori, Chiba (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 12/409,037

(22) Filed: Mar. 23, 2009

(65) Prior Publication Data

US 2009/0265481 A1    Oct. 22, 2009

(30) Foreign Application Priority Data

Apr. 18, 2008    (JP) .................................. 2008-109266

(51) Int. Cl.
*G06F 3/00*    (2006.01)

(52) U.S. Cl. ................ 710/1; 710/20; 710/38; 370/310; 370/351

(58) Field of Classification Search ......................... None
See application file for complete search history.

(56) References Cited

U.S. PATENT DOCUMENTS

| | | | | | |
|---|---|---|---|---|---|
| 4,872,129 | A * | 10/1989 | Pfeifer et al. | ................ | 708/313 |
| 6,898,235 | B1 * | 5/2005 | Carlin et al. | ................ | 375/219 |
| 2003/0193923 | A1 * | 10/2003 | Abdelgany et al. | ........... | 370/342 |
| 2004/0036637 | A1 * | 2/2004 | Singvall et al. | ............... | 341/138 |
| 2004/0196902 | A1 * | 10/2004 | Faroudja | ..................... | 375/240.1 |
| 2005/0050126 | A1 * | 3/2005 | Curtis et al. | ................ | 708/300 |
| 2005/0163249 | A1 * | 7/2005 | McCallister | ................... | 375/296 |
| 2006/0121873 | A1 * | 6/2006 | Ammar | .......................... | 455/326 |
| 2007/0172169 | A1 * | 7/2007 | Kish et al. | ....................... | 385/14 |
| 2007/0200621 | A1 * | 8/2007 | Lee | ................... | 330/10 |
| 2008/0037618 | A1 * | 2/2008 | LeBlanc et al. | ............... | 375/222 |
| 2008/0215300 | A1 * | 9/2008 | Sarkkinen et al. | ................. | 703/4 |

FOREIGN PATENT DOCUMENTS

| | | |
|---|---|---|
| JP | 8-328593 | 12/1996 |
| JP | 2004-208124 | 7/2004 |

OTHER PUBLICATIONS

J. Robert Jump, "Effective Pipelining of Digital Systems", IEEE Transactions on Computers, XP009106095, vol. C-27, No. 9, Sep. 1978, pp. 855-865.

\* cited by examiner

*Primary Examiner* — Henry Tsai
*Assistant Examiner* — Michael Sun
(74) *Attorney, Agent, or Firm* — Oblon, Spivak, McClelland, Maier & Neustadt, L.L.P.

(57) ABSTRACT

A signal processing device is a predetermined signal processing device among signal processing devices which perform signal processing on an input signal that is input to any one of the signal processing devices in such a manner that the signal processing devices share signal processing. The signal processing device includes a signal processing section that performs signal processing on a first-bandwidth signal, which is included in the input signal, in accordance with a processing capability of the signal processing device to generate a first output signal; and a signal integration section that integrates a second output signal with the first output signal, and that outputs the integrated signal to a second different signal processing device, the second output signal being generated in a first different signal processing device by performing signal processing on a second-bandwidth signal, which is included in the input signal.

13 Claims, 19 Drawing Sheets

SIGNAL PROCESSING DEVICE AND METHOD, PROGRAM, AND SIGNAL PROCESSING SYSTEM

BACKGROUND OF THE INVENTION

1. Field of the Invention

The present invention relates to a signal processing device and method, a program, and a signal processing system, and, more particularly, to a signal processing device and method that can support increasing of the bandwidth of a signal without discarding existing systems, a program, and a signal processing system.

2. Description of the Related Art

In a signal processing system of the related art, in a case in which a signal processing section, a signal transmission line, an input/output interface, and so forth do not support increasing of the bandwidth of an input signal, when the bandwidth of an input signal is increased, replacement of the entire signal processing system with another signal processing system is performed. Alternatively, the bandwidth of the input signal is reduced using a scheme, and the input signal is input.

When the entire signal processing system is replaced with a new signal processing system, in addition to cost of introducing the new signal processing system for replacement, cost of discarding the existing signal processing system is necessary. Furthermore, when the bandwidth of an input signal is to be reduced, an increased bandwidth is ignored. Thus, it is difficult to have an advantage due to an improvement in quality of the input signal that is obtained by increasing the bandwidth of the input signal.

Generally, an improvement in quality of a signal that is obtained by increasing the bandwidth of the signal is regarded as important. Thus, even when cost is necessary, replacement of the entire signal processing system is selected in most cases.

More specifically, for example, in a case in which the bit rate of communication that is performed in a computer network is increased, in order to have an advantage due to an increase in communication speed, a communication device that has been mounted in a computer so far and that performs processing at a low speed is discarded, and is replaced with a communication device that performs processing at a high speed.

The communication device that performs processing at a high speed is compatible with the communication device that performs processing at a low speed. The communication device that performs processing at a high speed and the communication device that performs processing at a low speed can be connected to each other. Accordingly, even when both the communication device that performs processing at a high speed and the communication device that performs processing at a low speed exist in a computer network, there is no problem. However, because an advantage due to an increase in communication speed is very significant, even when comparison with cost of replacement is considered. Thus, replacement of communication devices in the entire computer network with communication devices that perform processing at a high speed is generally performed.

However, such replacement leads to an increase in the number of wastes such as communication devices of the related art that perform processing at a low speed. There is a problem that the increase in the number of wastes causes deterioration in environment that is currently a social issue.

For this reason, for example, a scheme is proposed as a scheme in which increasing of a bandwidth is supported (for example, see Japanese Unexamined Patent Application Publication No. 2004-208124). In the scheme, concentration of 100 BASE-TX data (data based on 100 BASE-TX specifications) is supervised in real-time communication from an internet protocol (IP) telephone. When it is determined that there is a probability of occurrence of overflow, a transmission bandwidth control device on the opposite station side is notified of the probability of occurrence of overflow. A transmission bandwidth for 100 BASE-TX data in a wireless zone that is used for real-time communication from a personal computer is reduced, and a transmission bandwidth in a wireless zone that is used for real-time communication from the IP telephone is increased, in such a manner that reduction in the transmission bandwidth is synchronized with increase in the transmission bandwidth.

SUMMARY OF THE INVENTION

However, in the scheme that is disclosed in Japanese Unexamined Patent Application Publication No. 2004-208124, it is difficult to support increasing of a bandwidth in the entire communication by using a single device, and it is difficult to process an input signal having a bandwidth that exceeds a bandwidth which can be processed by a single device.

In view of the above-described circumstances, it is desirable to support increasing of the bandwidth of a signal in a signal processing system without discarding existing systems.

According to a first embodiment of the present invention, there is provided a signal processing device that is a predetermined signal processing device among a plurality of signal processing devices which perform signal processing on an input signal that is input to any one of the plurality of signal processing devices in such a manner that the plurality of signal processing devices share signal processing. The signal processing device includes signal processing means for performing signal processing on a first-bandwidth signal having a first bandwidth in accordance with a processing capability of the signal processing device to generate a first output signal, the first-bandwidth signal being included in the input signal; and signal integration means for integrating a second output signal with the first output signal, thereby obtaining an integrated signal, and for outputting the integrated signal to a second different signal processing device, the second output signal being generated in a first different signal processing device by performing signal processing on a second-bandwidth signal having a second bandwidth in accordance with a processing capability of the first different signal processing device, the second-bandwidth signal being included in the input signal.

The signal processing device further includes signal division means for dividing the input signal into the first-bandwidth signal and a third-bandwidth signal having a third bandwidth. The signal processing device can cause the signal processing means to generate the first output signal having the first bandwidth. The signal processing device can cause the signal integration means to integrate a third output signal having the third bandwidth with the first output signal, thereby obtaining an integrated signal, and to output the integrated signal to the second different signal processing device, the third-bandwidth signal being divided into the second-bandwidth signal and a fourth-bandwidth signal having a fourth bandwidth in the first different signal processing device, the third output signal being obtained by integrating the second output signal having the second bandwidth with the fourth-bandwidth signal that is supplied from a third different signal processing device.

The signal processing device can cause the signal division means to divide a fifth-bandwidth signal having a fifth bandwidth into the first-bandwidth signal and the third-bandwidth signal, the fifth-bandwidth signal being obtained in the second different signal processing device by dividing the input signal.

The signal processing device can cause the signal processing means to generate the first output signal by amplifying the first output signal in accordance with the processing capability of the signal processing device. The signal processing device can cause the signal integration means to integrate a fourth output signal with the first output signal that is amplified by the signal processing means, thereby obtaining an integrated signal, and to output the integrated signal to the second different signal processing device, the fourth output signal being obtained by integrating the second output signal with a third output signal, the second output signal being generated in the first different signal processing device by amplifying the second output signal in accordance with the processing capability of the first different signal processing device, the third output signal being generated in a third different signal processing device by amplifying the third output signal in accordance with a processing capability of the third different signal processing device.

The signal processing device further includes instructing means for providing an instruction for the first bandwidth in signal processing that is involved in signal processing which is shared among the plurality of signal processing devices in accordance with processing capabilities of the plurality of signal processing devices, and that is performed by the signal processing means.

According to another embodiment of the present invention, there is provided a signal processing method that is performed by a predetermined signal processing device among a plurality of signal processing devices which perform signal processing on an input signal that is input to any one of the plurality of signal processing devices in such a manner that the plurality of signal processing devices share signal processing. The signal processing method includes the steps of: signal processing of performing signal processing on a first-bandwidth signal having a first bandwidth in accordance with a processing capability of the signal processing device to generate a first output signal, the first-bandwidth signal being included in the input signal; and signal integrating of integrating a second output signal with the first output signal, thereby obtaining an integrated signal, and of outputting the integrated signal to a second different signal processing device, the second output signal being generated in a first different signal processing device by performing signal processing on a second-bandwidth signal having a second bandwidth in accordance with a processing capability of the first different signal processing device, the second-bandwidth signal being included in the input signal.

According to another embodiment of the present invention, there is provided a program that causes a computer to perform processing, the computer controlling a predetermined signal processing device among a plurality of signal processing devices which perform signal processing on an input signal that is input to any one of the plurality of signal processing devices in such a manner that the plurality of signal processing devices share signal processing. The processing includes the steps of: signal processing of performing signal processing on a first-bandwidth signal having a first bandwidth in accordance with a processing capability of the signal processing device to generate a first output signal, the first-bandwidth signal being included in the input signal; and signal integrating of integrating a second output signal with the first output signal, thereby obtaining an integrated signal, and of outputting the integrated signal to a second different signal processing device, the second output signal being generated in a first different signal processing device by performing signal processing on a second-bandwidth signal having a second bandwidth in accordance with a processing capability of the first different signal processing device, the second-bandwidth signal being included in the input signal.

According to another embodiment of the present invention, there is provided a signal processing system including a plurality of signal processing devices which perform signal processing on an input signal that is input to any one of the plurality of signal processing devices in such a manner that the plurality of signal processing devices share signal processing, a predetermined signal processing device being a signal processing device among the plurality of signal processing devices in the signal processing system. The predetermined signal processing device includes signal processing means for performing signal processing on a first-bandwidth signal having a first bandwidth in accordance with a processing capability of the signal processing device to generate a first output signal, the first-bandwidth signal being included in the input signal; and signal integration means for integrating a second output signal with the first output signal, thereby obtaining an integrated signal, and for outputting the integrated signal to a second different signal processing device, the second output signal being generated in a first different signal processing device by performing signal processing on a second-bandwidth signal having a second bandwidth in accordance with a processing capability of the first different signal processing device, the second-bandwidth signal being included in the input signal.

The predetermined signal processing device further includes signal division means for dividing the input signal into the first-bandwidth signal and a third-bandwidth signal having a third bandwidth. The signal processing system can cause the signal processing means to generate the first output signal having the first bandwidth. The signal processing system can cause the signal integration means to integrate a third output signal having the third bandwidth with the first output signal, thereby obtaining an integrated signal, and to output the integrated signal to the second different signal processing device, the third-bandwidth signal being divided into the second-bandwidth signal and a fourth-bandwidth signal having a fourth bandwidth in the first different signal processing device, the third output signal being obtained by integrating the second output signal having the second bandwidth with the fourth-bandwidth signal that is supplied from a third different signal processing device.

The signal processing system can cause the signal processing means to generate the first output signal by amplifying the first output signal in accordance with the processing capability of the signal processing device. The signal processing system can cause the signal integration means to integrate a fourth output signal with the first output signal that is amplified by the signal processing means, thereby obtaining an integrated signal, and to output the integrated signal to the second different signal processing device, the fourth output signal being obtained by integrating the second output signal with a third output signal, the second output signal being generated in the first different signal processing device by amplifying the second output signal in accordance with the processing capability of the first different signal processing device, the third output signal being generated in a third different signal processing device by amplifying the third output signal in accordance with a processing capability of the third different signal processing device.

According to one of the embodiments of the present invention, signal processing is performed, in accordance with the processing capability of the signal processing device, on the first-bandwidth signal having the first bandwidth that is included in the input signal to generate the first output signal. In the first different signal processing device, the second output signal is generated by performing signal processing, in accordance with the processing capability of the first different signal processing device, on the second-bandwidth signal having the second bandwidth that is included in the input signal. The second output signal is integrated with the first output signal, thereby obtaining an integrated signal, and the integrated signal is output to the second different signal processing device.

According to one of the embodiments of the present invention, signal processing is performed, in accordance with the processing capability of the signal processing device, on the first-bandwidth signal having the first bandwidth that is included in the input signal to generate the first output signal. In the first different signal processing device, the second output signal is generated by performing signal processing, in accordance with the processing capability of the first different signal processing device, on the second-bandwidth signal having the second bandwidth that is included in the input signal. The second output signal is integrated with the first output signal, thereby obtaining an integrated signal, and the integrated signal is output to the second different signal processing device.

According to the embodiments of the present invention, increasing of the bandwidth of a signal can be supported in a signal processing system without discarding existing systems.

DESCRIPTION OF THE PREFERRED EMBODIMENTS

Embodiments of the present invention will be described below with reference to the accompanying drawings.

Figure 1:
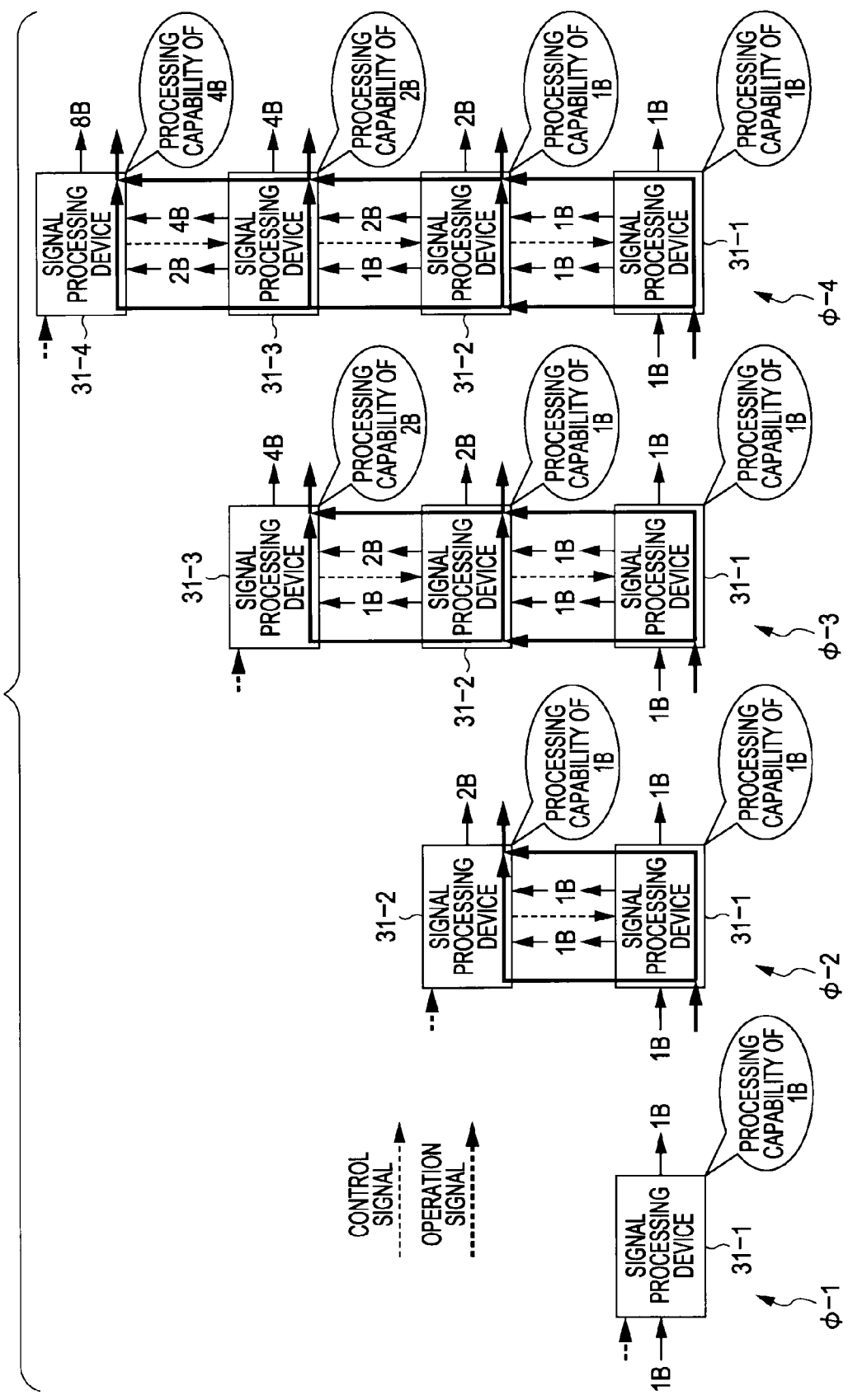
FIG. 1 is a diagram showing an example of a configuration of a signal processing system according to an embodiment of the present invention.

FIG. 1 shows an example of a configuration of a signal processing system according to an embodiment of the present invention.

In FIG. 1, the signal processing system in four states, i.e., states $\phi$-1 to $\phi$-4, is shown. The signal processing system in the state $\phi$-1 is configured using only a signal processing device 31-1. The signal processing system in the state $\phi$-2 is configured by adding a signal processing device 31-2 to the signal processing system in the state $\phi$-1. The signal processing system in the state $\phi$-3 is configured by adding a signal processing device 31-3 to the signal processing system in the state $\phi$-2. The signal processing system in the state $\phi$-4 is configured by adding a signal processing device 31-4 to the signal processing system in the state $\phi$-3.

Note that, as in the case of the signal processing system in the state $\phi$-1, a system that is configured using a single signal processing device is also referred to as a "signal processing system" for the sake of convenience, and such signal processing systems in the following cases can be described as in the case given above.

Referring to FIG. 1, the signal processing device 31-1 can perform signal processing at a bandwidth of at most one Byte (1 B). When a signal having a bandwidth of one Byte (hereinafter, referred to as a "1 B-bandwidth signal") is input, the signal processing device 31-1 performs predetermined signal processing on the signal in accordance with an operation signal (indicated by a thick broken line in FIG. 1) that is generated by performing a user operation, and outputs a 1 B-bandwidth signal.

The signal processing device 31-2 can alone perform signal processing at a bandwidth of at most 1 B as in the case of the signal processing device 31-1. When a 1 B-bandwidth signal is input, the signal processing device 31-2 performs predetermined signal processing on the signal in accordance with an operation signal that is generated by performing a user operation, and outputs a 1 B-bandwidth signal.

The signal processing device 31-3 can alone perform signal processing at a bandwidth of at most 2 B. When a 2 B-bandwidth signal is input, the signal processing device 31-3 performs predetermined signal processing on the signal in accordance with an operation signal that is generated by performing a user operation, and outputs a 2 B-bandwidth signal.

The signal processing device 31-4 can alone perform signal processing at a bandwidth of at most 4 B. When a 4 B-bandwidth signal is input, the signal processing device 31-4 performs predetermined signal processing on the signal in accordance with an operation signal that is generated by performing a user operation, and outputs a 4 B-bandwidth signal.

As shown using thick lines in FIG. 1, the signal processing system shown in FIG. 1 performs, in accordance with an operation signal in such a manner that the signal processing devices share signal processing, signal processing on an input signal having a predetermined format that is input to any one of the signal processing devices which constitute the signal processing system. The signal processing system integrates output signals that are output from the respective signal processing devices, thereby obtaining an integrated signal, and outputs the integrated signal.

Here, sharing of signal processing among the signal processing devices 31-1 to 31-4 that constitute the signal processing system shown in FIG. 1 will be described with reference to FIGS. 1 and 2.

Figure 2:
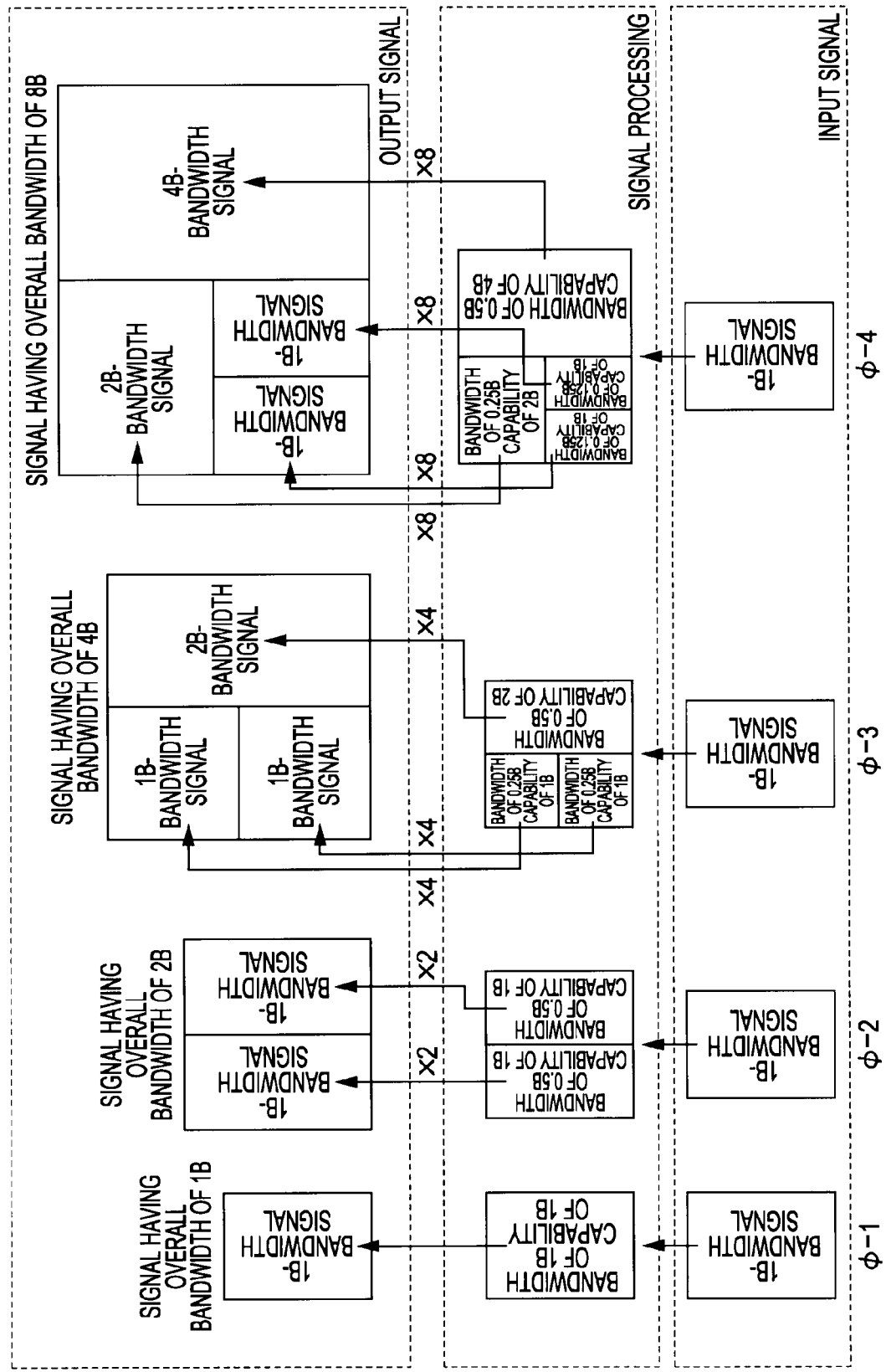
FIG. 2 is a diagram illustrating concepts regarding sharing of signal processing among signal processing devices that constitute the signal processing system shown in FIG. 1.

FIG. 2 illustrates concepts regarding sharing of signal processing among the signal processing devices 31-1 to 31-4 that constitute the signal processing system shown in FIG. 1.

In FIG. 2, the concepts regarding sharing of signal processing in the signal processing system in the states φ-1 to φ-4 shown in FIG. 1 are illustrated from the left to the right.

Furthermore, in FIG. 2, bandwidths of input signals, bandwidths at which the respective signal processing devices perform signal processing, and bandwidths of output signals are shown from the bottom to the top in portions that are bordered using frames indicated by broken lines.

First, the signal processing system in the state φ-1 is configured using only the signal processing device 31-1 as shown in FIG. 1. As shown in FIG. 2, the signal processing device 31-1 performs signal processing at a bandwidth of 1 B on a 1 B-bandwidth signal that is an input signal, and outputs a 1 B-bandwidth signal as an output signal.

The signal processing system in the state φ-2 is configured using the signal processing devices 31-1 and 31-2 as shown in FIG. 1. The signal processing devices 31-1 and 31-2 perform, in accordance with an operation signal that is input to the signal processing device 31-2 and a control signal (indicated by a thin broken line in FIG. 1) based on the operation signal, signal processing on an input signal that is input to the signal processing device 31-1 in such a manner that the signal processing devices 31-1 and 31-2 share signal processing. In other words, as shown in FIG. 2, each of the signal processing devices 31-1 and 31-2 performs, in accordance with a corresponding one of the operation signal and the control signal, signal processing on a 0.5 B-bandwidth signal that is included in a 1 B-bandwidth signal which is the input signal, and amplifies the 0.5 B-bandwidth signal (by a factor of two) so that the 0.5 B-bandwidth signal can have a bandwidth (of 1 B) which corresponds to the upper limit of a processing capability of the signal processing device, thereby obtaining a 1 B-bandwidth signal. As shown in FIG. 2, the signal processing device 31-2 integrates the 1 B-bandwidth signals, which are obtained by performing signal processing with the respective signal processing devices 31-1 and 31-2, thereby obtaining a 2 B-bandwidth signal, and outputs the 2 B-bandwidth signal as an output signal.

With this configuration, when an input signal having a bandwidth of 1 B is input, the signal processing system in the state φ-2 can output an output signal having a bandwidth of 2 B that is increased so as to exceed each of the processing capabilities (1 B) of the signal processing devices.

The signal processing system in the state φ-3 is configured using the signal processing devices 31-1 to 31-3 as shown in FIG. 1. The signal processing devices 31-1 to 31-3 perform, in accordance with an operation signal that is input to the signal processing device 31-3 and control signals based on the operation signal, signal processing on an input signal that is input to the signal processing device 31-1 in such a manner that the signal processing devices 31-1 to 31-3 share signal processing. In other words, as shown in FIG. 2, each of the signal processing devices 31-1 and 31-2 performs, in accordance with a corresponding one of the control signals, signal processing on a 0.25 B-bandwidth signal that is included in a 1 B-bandwidth signal which is the input signal, and amplifies the 0.25 B-bandwidth signal (by a factor of four) so that the 0.25 B-bandwidth signal can have a bandwidth (of 1 B) which corresponds to the upper limit of the processing capability of the signal processing device, thereby obtaining a 1 B-bandwidth signal. Furthermore, as shown in FIG. 2, the signal processing device 31-3 performs, in accordance with the operation signal, signal processing on a 0.5 B-bandwidth signal that is included in the 1 B-bandwidth signal which is the input signal, and amplifies the 0.5 B-bandwidth signal (by a factor of four) so that the 0.5 B-bandwidth signal can have a bandwidth (of 2 B) which corresponds to the upper limit of a processing capability of the signal processing device 31-3, thereby obtaining a 2 B-bandwidth signal. As shown in FIG. 2, the signal processing device 31-3 integrates the 1 B-bandwidth signals, which are obtained by performing signal processing with the respective signal processing devices 31-1 and 31-2, with the 2 B-bandwidth signal, which is obtained by performing signal processing with the signal processing device 31-3, thereby obtaining a 4 B-bandwidth signal, and outputs the 4 B-bandwidth signal as an output signal.

With this configuration, when an input signal having a bandwidth of 1 B is input, the signal processing system in the state φ-3 can output an output signal having a bandwidth of 4 B that is increased so as to exceed each of the processing capabilities (1 B and 2 B) of the signal processing devices.

The signal processing system in the state φ-4 is configured using the signal processing devices 31-1 to 31-4 as shown in FIG. 1. The signal processing devices 31-1 to 31-4 perform, in accordance with an operation signal that is input to the signal processing device 31-4 and control signals based on the operation signal, signal processing on an input signal that is input to the signal processing device 31-1 in such a manner that the signal processing devices 31-1 to 31-4 share signal processing. In other words, as shown in FIG. 2, each of the signal processing devices 31-1 and 31-2 performs, in accordance with a corresponding one of the control signals, signal processing on a 0.125 B-bandwidth signal that is included in a 1 B-bandwidth signal which is the input signal, and amplifies the 0.125 B-bandwidth signal (by a factor of eight) so that the 0.125 B-bandwidth signal can have a bandwidth (of 1 B) which corresponds to the upper limit of the processing capability of the signal processing device, thereby obtaining a 1 B-bandwidth signal. Furthermore, as shown in FIG. 2, the signal processing device 31-3 performs, in accordance with a corresponding one of the control signals, signal processing on a 0.25 B-bandwidth signal that is included in the 1 B-bandwidth signal which is the input signal, and amplifies the 0.25 B-bandwidth signal (by a factor of eight) so that the 0.25 B-bandwidth signal can have a bandwidth (of 2 B) which corresponds to the upper limit of the processing capability of the signal processing device 31-3, thereby obtaining a 2

B-bandwidth signal. Moreover, as shown in FIG. 2, the signal processing device 31-4 performs, in accordance with the operation signal, signal processing on a 0.5 B-bandwidth signal that is included in the 1 B-bandwidth signal which is the input signal, and amplifies the 0.5 B-bandwidth signal (by a factor of eight) so that the 0.5 B-bandwidth signal can have a bandwidth (of 4 B) which corresponds to the upper limit of a processing capability of the signal processing device 31-4, thereby obtaining a 4 B-bandwidth signal. The signal processing device 31-4 integrates the 1 B-bandwidth signals, which are obtained by performing signal processing with the respective signal processing devices 31-1 and 31-2, the 2 B-bandwidth signal, which is obtained by performing signal processing with the signal processing device 31-3, and the 4 B-bandwidth signal, which is obtained by performing signal processing with the signal processing device 31-4, thereby obtaining an 8 B-bandwidth signal, and outputs the 8 B-bandwidth signal as an output signal.

With this configuration, when an input signal having a bandwidth of 1 B is input, the signal processing system in the state φ-4 can output an output signal having a bandwidth of 8 B that is increased so as to exceed each of the processing capabilities (1 B, 2 B, and 4 B) of the signal processing devices.

Here, a specific example of the configuration of the signal processing system in the state φ-3, which is shown as an example of the signal processing system shown in FIG. 1, will be described with reference to a block diagram shown in FIG. 3.

Note that the reason for showing the signal processing system in the state φ-3 as an example of the signal processing system shown in FIG. 1 is that the signal processing system in the state φ-3 includes the configurations of the signal processing system in the states φ-1 and φ-2. Furthermore, even when a signal processing system is configured using four or more signal processing devices as in the case of the signal processing system in the state φ-4, the signal processing system can be described as in the case of the signal processing system in the state φ-3.

Figure 3:
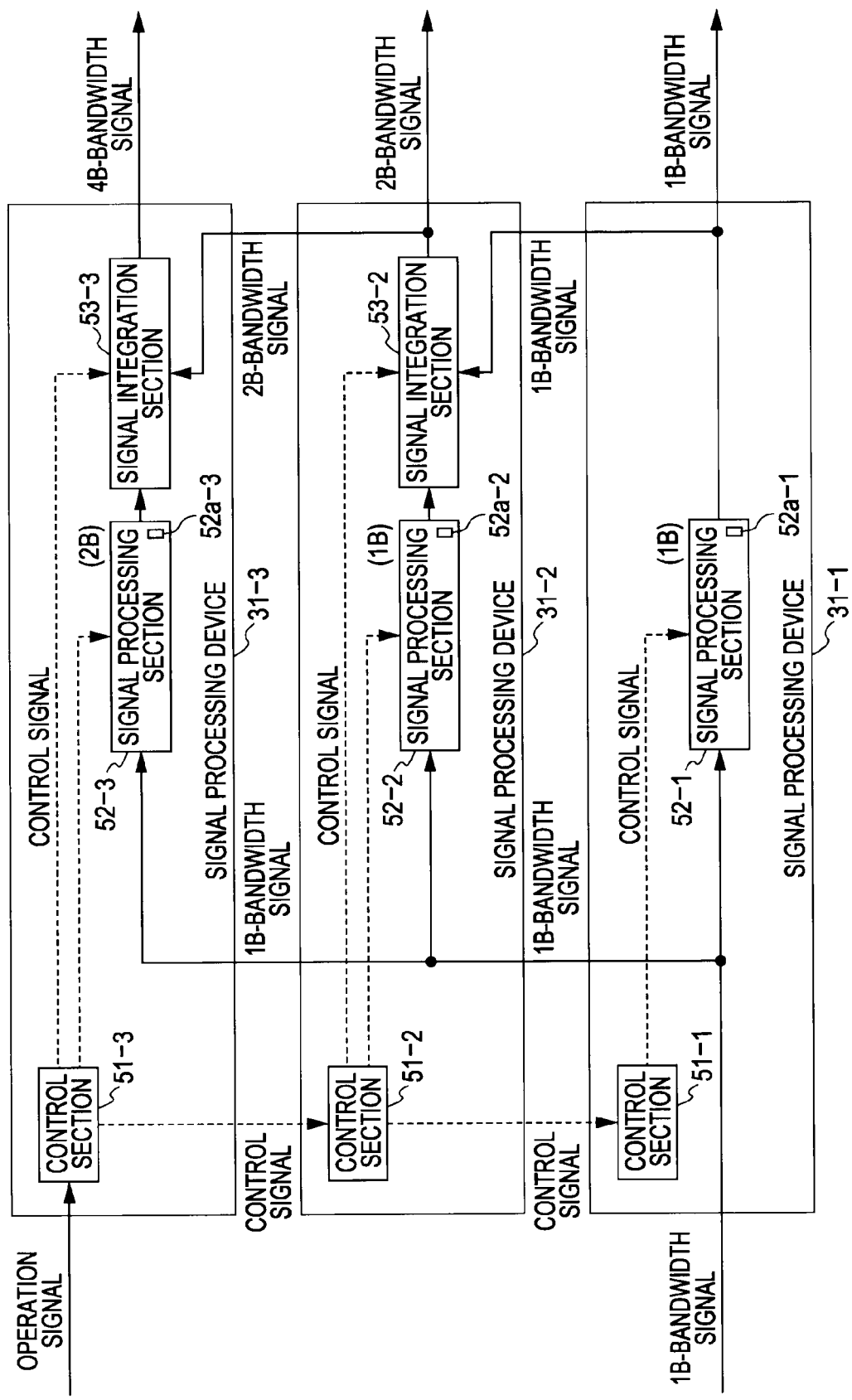
FIG. 3 is a diagram showing a specific example of a configuration of the signal processing system shown in FIG. 1.

The signal processing device 31-1 shown in FIG. 3 includes a control section 51-1 and a signal processing section 52-1. The signal processing device 31-2 includes a control section 51-2, a signal processing section 52-2, and a signal integration section 53-2. The signal processing device 31-3 includes a control section 51-3, a signal processing section 52-3, and a signal integration section 53-3.

Here, numbers following hyphens (-) in representations using numbers that denote the respective sections which constitute the signal processing devices 31-1 to 31-3 correspond to numbers following hyphens in representations using numbers that denote the respective signal processing devices 31-1 to 31-3. In other words, since the signal processing device 31-1 does not have any signal integration section, a signal integration section 53-1 does not exist.

The control section 51-1 of the signal processing device 31-1 supplies a control signal to the signal processing section 52-1 in accordance with a control signal that is supplied from the control section 51-3 of the signal processing device 31-3 via the control section 51-2 of the signal processing device 31-2, and the control signal that is supplied from the control section 51-1 is provided as an instruction for a processing bandwidth (a bandwidth) at which the signal processing section 52-1 is to perform signal processing on an input signal.

The signal processing section 52-1 performs, in accordance with the control signal that is supplied from the control section 51-1, predetermined signal processing on an input signal that is included in the input signal and that has a bandwidth which corresponds to a processing bandwidth according to the instruction provided by the control section 51-1. The signal processing section 52-1 includes an amplifier unit 52a-1. The amplifier unit 52a-1 amplifies a processing result of performance of signal processing so that the result can have a bandwidth corresponding to the upper limit (1 B) of a processing capability of the signal processing section 52-1, thereby obtaining an amplified signal. The signal processing section 52-1 supplies the amplified signal to the signal integration section 53-2 of the signal processing device 31-2.

The control section 51-2 of the signal processing device 31-2 supplies a control signal to the signal processing section 52-2 in accordance with a control signal that is supplied from the control section 51-3 of the signal processing device 31-3, and the control signal that is supplied from the control section 51-2 is provided as an instruction for a processing bandwidth at which the signal processing section 52-2 is to perform signal processing on the input signal.

The signal processing section 52-2 performs, in accordance with the control signal that is supplied from the control section 51-2, predetermined signal processing on an input signal that is included in the input signal and that has a bandwidth which corresponds to a processing bandwidth according to the instruction provided by the control section 51-2. The signal processing section 52-2 includes an amplifier unit 52a-2. The amplifier unit 52a-2 amplifies a processing result of performance of signal processing so that the result can have a bandwidth corresponding to the upper limit (1 B) of a processing capability of the signal processing section 52-2, thereby obtaining an amplified signal. The signal processing section 52-2 supplies the amplified signal to the signal integration section 53-2.

The signal integration section 53-2 integrates, under control that is performed by the control section 51-2, the signal (the 1 B-bandwidth signal) that is supplied from the signal processing section 52-1 of the signal processing device 31-1 with the signal (the 1 B-bandwidth signal) that is supplied from the signal processing section 52-2, thereby obtaining a 2 B-bandwidth signal. The signal integration section 53-2 supplies the integrated 2 B-bandwidth signal to the signal integration section 53-3 of the signal processing device 31-3.

The control section 51-3 of the signal processing device 31-3 determines, in accordance with the operation signal that is supplied from an operation section (not illustrated) and that indicates a user operation and in accordance with processing capabilities of the signal processing sections 52-1 to 52-3, the processing bandwidths at which the signal processing sections 52-1 to 52-3 are to perform signal processing on the input signal. The control section 51-3 supplies, to the control sections 51-1 and 51-2, and the signal processing section 52-3, the control signals for instructing the signal processing sections 52-1 to 52-3 to perform signal processing at the determined processing bandwidths. Furthermore, the control section 51-3 controls an operation of the signal integration section 53-3.

In other words, the control section 51-3 exercises overall control of the signal processing system. In this manner, in the signal processing system shown in FIG. 1, a control section of a newly added signal processing device (a signal processing device that is shown at the top in FIG. 1) controls control sections of the other signal processing devices, thereby exercising overall control of the signal processing system.

The signal processing section 52-3 performs, in accordance with a corresponding one of the control signals that are supplied from the control section 51-3, predetermined signal processing on an input signal that is included in the input signal and that has a bandwidth which corresponds to a processing bandwidth according to the instruction provided by the control section 51-3. The signal processing section 52-3 includes an amplifier unit 52a-3. The amplifier unit 52a-3 amplifies a processing result of performance of signal processing so that the result can have a bandwidth corresponding to the upper limit (2 B) of a processing capability of the signal processing section 52-3, thereby obtaining an amplified signal. The signal processing section 52-3 supplies the amplified signal to the signal integration section 53-3.

The signal integration section 53-3 integrates, under control that is performed by the control section 51-3, the signal (the 2 B-bandwidth signal) that is supplied from the signal processing section 52-2 of the signal processing device 31-2 with the signal (the 2 B-bandwidth signal) that is supplied from the signal processing section 52-3, thereby obtaining a 4 B-bandwidth signal, and outputs the 4 B-bandwidth signal.

Figure 4:
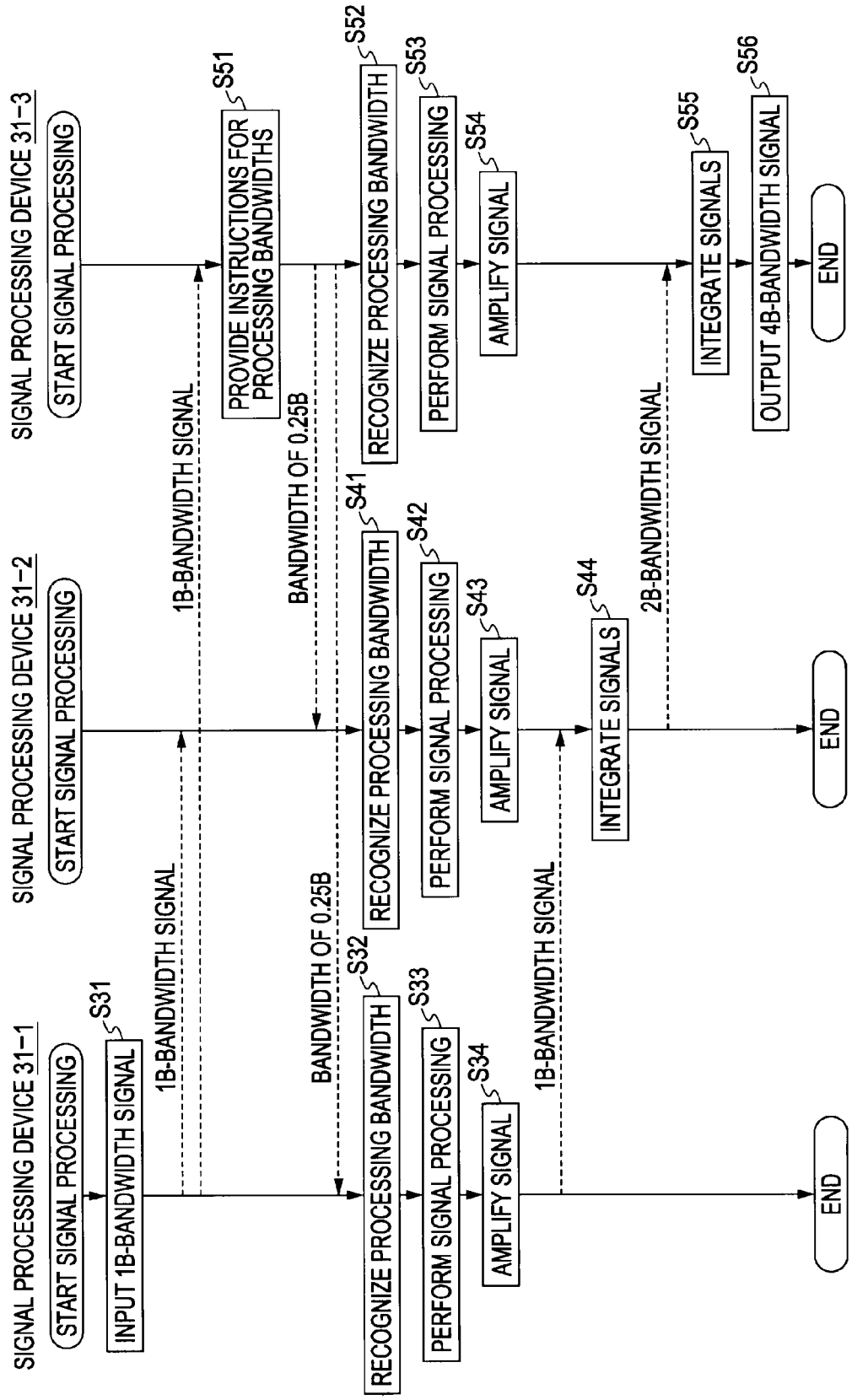
FIG. 4 is a flowchart for explaining signal processing that is performed in the signal processing system shown in FIG. 3.

Next, signal processing that is performed in the signal processing system shown in FIG. 3 will be described with reference to a flowchart shown in FIG. 4.

In step S31, an input section (not illustrated) of the signal processing device 31-1 inputs a 1 B-bandwidth signal. In this case, the input 1 B-bandwidth signal is also supplied (distributed) to the signal processing devices 31-2 and 31-3.

In step S51, the control section 51-3 of the signal processing device 31-3 determines, in accordance with the operation signal that is supplied from the operation section (not illustrated) and that indicates a user operation and in accordance with the processing capabilities of the signal processing sections 52-1 to 52-3 in the signal processing system, processing bandwidths at which the signal processing sections 52-1 to 52-3 are to perform signal processing in such a manner that the signal processing sections 52-1 to 52-3 share signal processing. The control section 51-3 provides instructions for the determined processing bandwidths to the related sections. More specifically, the control section 51-3 determines that the signal processing sections 52-1 to 52-3 are to perform signal processing on the input 1 B-bandwidth signal at processing bandwidths of 0.25 B, 0.25 B, and 0.5 B, respectively. The control section 51-3 supplies control signals indicating the determined processing bandwidths to the control sections 51-1 and 51-2, and the signal processing section 52-3.

In step S32, the control section 51-1 of the signal processing device 31-1 recognizes, in accordance with the control signal that is supplied from the control section 51-3 via the control section 51-2, the processing bandwidth of 0.25 B at which the signal processing section 52-1 is to perform signal processing. The control section 51-1 supplies a control signal indicating the processing bandwidth of 0.25 B to the signal processing section 52-1.

In step S33, the signal processing section 52-1 performs, in accordance with the control signal that is supplied from the control section 51-1, signal processing on an input signal that is included in the input signal (the 1 B-bandwidth signal) and that has a bandwidth of 0.25 B.

In step S34, the amplifier unit 52a-1 of the signal processing section 52-1 amplifies a signal that is obtained as a result of performance of signal processing so that the signal can have a bandwidth corresponding to the upper limit (1 B) of the processing capability of the signal processing section 52-1, thereby obtaining an amplified signal. The signal processing section 52-1 supplies the amplified signal to the signal integration section 53-2 of the signal processing device 31-2.

In step S41, the control section 51-2 of the signal processing device 31-2 recognizes, in accordance with a corresponding one of the control signals that are supplied from the control section 51-3, the processing bandwidth of 0.25 B at which the signal processing section 52-2 is to perform signal processing. The control section 51-2 supplies a control signal indicating the processing bandwidth of 0.25 B to the signal processing section 52-2.

In step S42, the signal processing section 52-2 performs, in accordance with the control signal that is supplied from the control section 51-2, signal processing on an input signal that is included in the input signal (the 1 B-bandwidth signal) and that has a bandwidth of 0.25 B.

In step S43, the amplifier unit 52a-2 of the signal processing section 52-2 amplifies a signal that is obtained as a result of performance of signal processing so that the signal can have a bandwidth corresponding to the upper limit (1 B) of the processing capability of the signal processing section 52-2, thereby obtaining an amplified signal. The signal processing section 52-2 supplies the amplified signal to the signal integration section 53-2.

In step S44, the signal integration section 53-2 of the signal processing device 31-2 integrates, under control that is performed by the control section 51-2, the signal (the 1 B-bandwidth signal) that is supplied from the control section 51-2 of the signal processing device 31-1 with the signal (the 1 B-bandwidth signal) that is supplied from the signal processing section 52-2, thereby obtaining a 2 B-bandwidth signal. The signal integration section 53-2 supplies the integrated 2 B-bandwidth signal to the signal integration section 53-3 of the signal processing device 31-3.

In step S52, the signal processing section 52-3 recognizes, in accordance with a corresponding one of the control signals that are supplied from the control section 51-3, the processing bandwidth of 0.5 B at which the signal processing section 52-3 is to perform signal processing.

In step S53, the signal processing section 52-3 performs, at the recognized processing bandwidth, signal processing on an input signal that is included in the input signal (the 1 B-bandwidth signal) and that has a bandwidth of 0.5 B.

In step S54, the amplifier unit 52a-3 of the signal processing section 52-3 amplifies a signal that is obtained as a result of performance of signal processing so that the signal can have a bandwidth corresponding to the upper limit (2 B) of the processing capability of the signal processing section 52-3, thereby obtaining an amplified signal. The signal processing section 52-3 supplies the amplified signal to the signal integration section 53-3.

In step S55, the signal integration section 53-3 of the signal processing device 31-3 integrates, under control that is performed by the control section 51-3, the signal (the 2 B-bandwidth signal) that is supplied from the signal processing section 52-2 of the signal processing device 31-2 with the signal (the 2 B-bandwidth signal) that is supplied from the signal processing section 52-3, thereby obtaining a 4 B-bandwidth signal.

In step S56, the signal integration section 53-3 outputs the 4 B-bandwidth signal that is integrated in step S55.

According to the above-described process, an input signal having a bandwidth of 1 B is input, and an output signal having a bandwidth of 4 B that is increased so as to exceed each of the processing capabilities of the signal processing devices 31-1 to 31-3 can be output.

Thus, in the signal processing system shown in FIG. 3, the bandwidth of an output signal can be increased to 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase the bandwidth of an output signal, increasing of the bandwidth of an output signal can be supported without discarding existing systems that do not have processing capabilities corresponding to the necessary bandwidths.

Note that the processing bandwidths at which the signal processing sections 52-1 to 52-3 are to perform signal processing, which are determined by the control section 51-3, are not limited to the above-described values. Other values in ranges of bandwidths at which the signal processing sections 52-1 to 52-3 can perform signal processing may be used.

In the above description, the signal processing system in the state $\phi$-3 shown in FIG. 1 is described. However, signal processing which is similar to that illustrated in FIG. 4 can also be performed in the signal processing system in the state $\phi$-2 or $\phi$-4 shown in FIG. 1 by applying a configuration which is similar to that shown in FIG. 3. Furthermore, even when the number of signal processing devices that constitute a signal processing system is five or more, the signal processing system can be described as in the case given above.

Moreover, in the above description, in step S44, the signal processing device 31-2 supplies the 2 B-bandwidth signal to the signal processing device 31-3. However, the signal processing device 31-2 can output the 2 B-bandwidth signal without further performing signal processing on the 2 B-bandwidth signal. Similarly, in the signal processing system in the state $\phi$-4 shown in FIG. 1, the signal processing device 31-2 can output the 2 B-bandwidth signal without further performing signal processing on the 2 B-bandwidth signal, and the signal processing device 31-3 can output the 4 B-bandwidth signal without further performing signal processing on the 4 B-bandwidth signal.

A configuration has been described above, in which increasing of the bandwidth of an output signal for the bandwidth of an input signal is supported. However, increasing of the bandwidths of an input signal and an output signal may also be supported.

Figure 5:
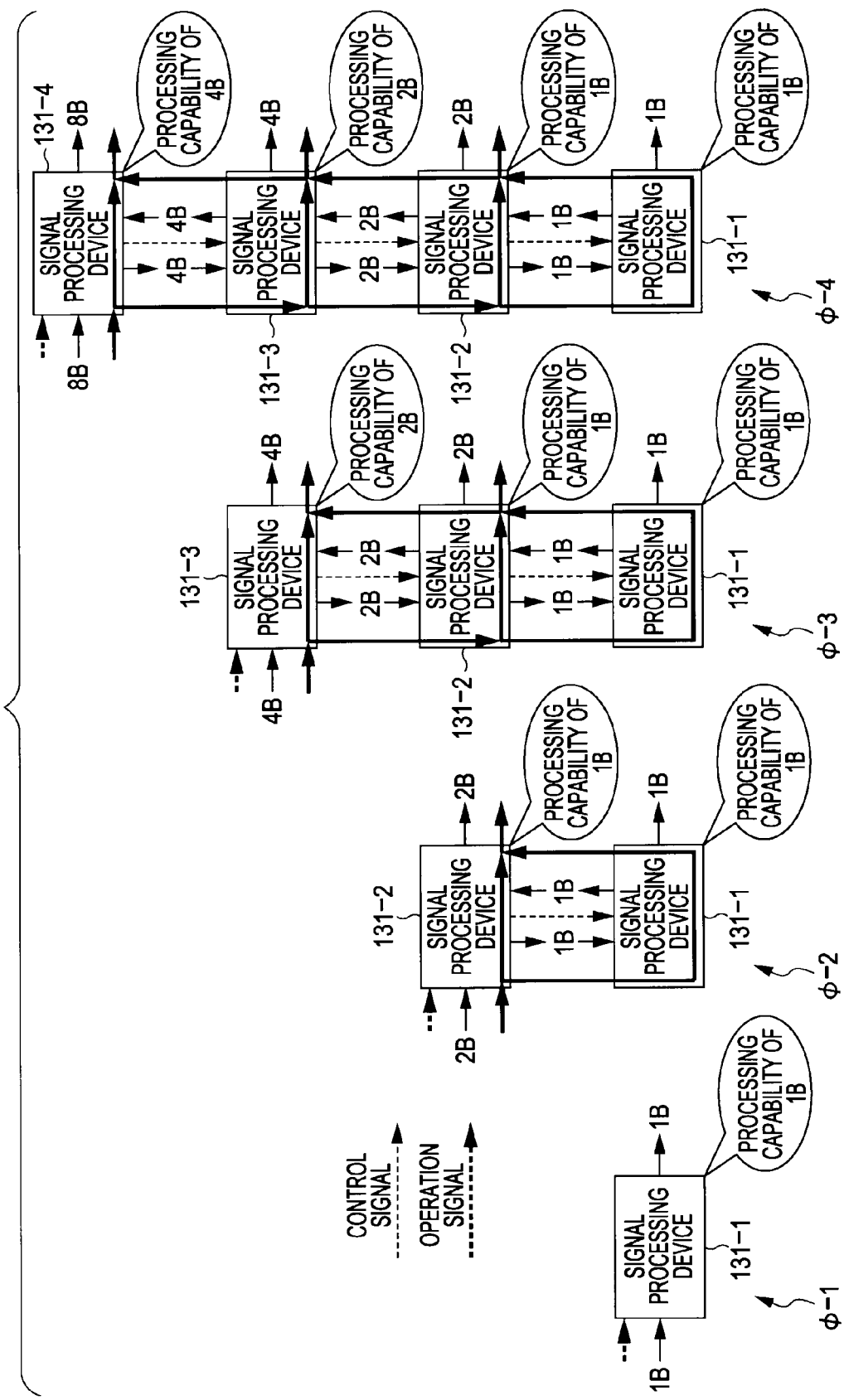
FIG. 5 is a diagram showing another example of the configuration of the signal processing system.

FIG. 5 shows an example of a configuration of a signal processing system in which increasing of the bandwidths of an input signal and an output signal is supported.

In FIG. 5, as in the case shown in FIG. 1, the signal processing system in four states, i.e., states $\phi$-1 to $\phi$-4, is shown. The signal processing system in the state $\phi$-1 is configured using only a signal processing device 131-1. The signal processing system in the state $\phi$-2 is configured by adding a signal processing device 131-2 to the signal processing system in the state $\phi$-1. The signal processing system in the state $\phi$-3 is configured by adding a signal processing device 131-3 to the signal processing system in the state $\phi$-2. The signal processing system in the state $\phi$-4 is configured by adding a signal processing device 131-4 to the signal processing system in the state $\phi$-3.

Referring to FIG. 5, the signal processing device 131-1 can perform signal processing at a bandwidth of at most 1 B. When a signal having a bandwidth of 1 B is input, the signal processing device 131-1 performs predetermined signal processing on the signal, and outputs a 1 B-bandwidth signal.

The signal processing device 131-2 can alone perform signal processing at a bandwidth of at most 1 B as in the case of the signal processing device 131-1. When a 1 B-bandwidth signal is input, the signal processing device 131-2 performs predetermined signal processing on the signal in accordance with an operation signal that is generated by performing a user operation, and outputs a 1 B-bandwidth signal.

The signal processing device 131-3 can alone perform signal processing at a bandwidth of at most 2 B. When a 2 B-bandwidth signal is input, the signal processing device 131-3 performs predetermined signal processing on the signal in accordance with an operation signal that is generated by performing a user operation, and outputs a 2 B-bandwidth signal.

The signal processing device 131-4 can alone perform signal processing at a bandwidth of at most 4 B. When a 4 B-bandwidth signal is input, the signal processing device 131-4 performs predetermined signal processing on the signal in accordance with an operation signal that is generated by performing a user operation, and outputs a 4 B-bandwidth signal.

As shown using thick lines in FIG. 5, the signal processing system shown in FIG. 5 divides an input signal that is input to any one of the signal processing devices which constitute the signal processing system into signals. The signal processing system performs signal processing on the divided signals in accordance with an operation signal that is input to any one of the signal processing devices in such a manner that the signal processing devices share signal processing. The signal processing system integrates output signals that are output from the respective signal processing devices, thereby obtaining an integrated signal, and outputs the integrated signal.

Here, an outline of signal processing that is performed in the signal processing system in the states $\phi$-1 to $\phi$-4 shown in FIG. 5 is described.

The signal processing system in the state $\phi$-1 is configured using only the signal processing device 131-1 as shown in FIG. 5. The signal processing device 131-1 performs signal processing at a bandwidth of 1 B on a 1 B-bandwidth signal that is an input signal, and outputs a 1 B-bandwidth signal as an output signal.

The signal processing system in the state $\phi$-2 is configured using the signal processing devices 131-1 and 131-2 as shown in FIG. 5. The signal processing devices 131-1 and 131-2 divide an input signal that is input to the signal processing device 131-2 into signals. The signal processing devices 131-1 and 131-2 perform, in accordance with an operation signal that is input to the signal processing device 131-2 and a control signal (indicated by a thin broken line in FIG. 5) based on the operation signal, signal processing on the divided signals in such a manner that the signal processing devices 131-1 and 131-2 share signal processing. In other words, each of the signal processing devices 131-1 and 131-2 performs, in accordance with a corresponding one of the operation signal and the control signal, signal processing on a corresponding one of 1 B-bandwidth signals that are obtained by dividing a 2 B-bandwidth signal, which is the input signal, thereby obtaining a 1 B-bandwidth signal. The signal processing device 131-2 integrates the 1 B-bandwidth signals, which are obtained by performing signal processing with the respective signal processing devices 131-1 and 131-2, thereby obtaining a 2 B-bandwidth signal, and outputs the 2 B-bandwidth signal as an output signal.

With this configuration, the signal processing system in the state $\phi$-2 can perform signal processing in accordance with the processing capabilities (1 B) of the respective signal processing devices on an input signal having a bandwidth of 2 B, and can output an output signal having a bandwidth of 2 B.

The signal processing system in the state $\phi$-3 is configured using the signal processing devices 131-1 to 131-3 as shown in FIG. 5. The signal processing devices 131-1 to 131-3 divide an input signal that is input to the signal processing device 131-3 into signals. The signal processing devices 131-1 to 131-3 perform, in accordance with an operation signal that is input to the signal processing device 131-3 and control signals based on the operation signal, signal processing on the divided signals in such a manner that the signal processing devices 131-1 to 131-3 share signal processing. In other words, the signal processing device 131-3 performs, in accordance with the operation signal, signal processing on one of 2 B-bandwidth signals that are obtained by dividing a 4 B-bandwidth signal, which is the input signal, thereby obtaining a 2 B-bandwidth signal. Furthermore, each of the signal processing devices 131-1 and 131-2 performs, in accordance with a corresponding one of the control signals, signal processing on a corresponding one of 1 B-bandwidth signals that are obtained by further dividing the remaining 2 B-bandwidth signal, which is obtained by dividing the input signal in the signal processing device 131-3, thereby obtaining a 1 B-bandwidth signal. The signal processing device 131-3 integrates the 1 B-bandwidth signals, which are obtained by performing signal processing with the respective signal processing devices 131-1 and 131-2, with the 2 B-bandwidth signal, which is obtained by performing signal processing with the signal processing device 131-3, thereby obtaining a 4 B-bandwidth signal, and outputs the 4 B-bandwidth signal as an output signal.

With this configuration, the signal processing system in the state $\phi$-3 can perform signal processing in accordance with the processing capabilities (1 B and 2 B) of the respective signal processing devices on an input signal having a bandwidth of 4 B, and can output an output signal having a bandwidth of 4 B.

The signal processing system in the state $\phi$-4 is configured using the signal processing devices 131-1 to 131-4 as shown in FIG. 5. The signal processing devices 131-1 to 131-4 divide an input signal that is input to the signal processing device 131-4 into signals. The signal processing devices 131-1 to 131-4 perform, in accordance with an operation signal that is input to the signal processing device 131-4 and control signals based on the operation signal, signal processing on the divided signals in such a manner that the signal processing devices 131-1 to 131-4 share signal processing. In other words, the signal processing device 131-4 performs, in accordance with the operation signal, signal processing on one of 4 B-bandwidth signals that are obtained by dividing an 8 B-bandwidth signal, which is the input signal, thereby obtaining a 4 B-bandwidth signal. Additionally, the signal processing device 131-3 performs, in accordance with a corresponding one of the control signals, signal processing on one of 2 B-bandwidth signals that are obtained by further dividing the remaining 4 B-bandwidth signal, which is obtained by dividing the input signal in the signal processing device 131-4, thereby obtaining a 2 B-bandwidth signal. Furthermore, each of the signal processing devices 131-1 and 131-2 performs, in accordance with a corresponding one of the control signals, signal processing on a corresponding one of 1 B-bandwidth signals that are obtained by further dividing the remaining 2 B-bandwidth signal, which is obtained by dividing the input signal in the signal processing device 131-3, thereby obtaining a 1 B-bandwidth signal. The signal processing device 131-4 integrates the 1 B-bandwidth signals, which are obtained by performing signal processing with the respective signal processing devices 131-1 and 131-2, the 2 B-bandwidth signal, which is obtained by performing signal processing with the signal processing device 131-3, and the 4 B-bandwidth signal, which is obtained by performing signal processing with the signal processing device 131-4, thereby obtaining an 8 B-bandwidth signal, and outputs the 8 B-bandwidth signal as an output signal.

With this configuration, the signal processing system in the state $\phi$-4 can perform signal processing in accordance with the processing capabilities (1 B, 2 B, and 4 B) of the respective signal processing devices on an input signal having a bandwidth of 8 B, and can output an output signal having a bandwidth of 8 B.

Here, a specific example of the configuration of the signal processing system in the state $\phi$-3, which is shown as an example of the signal processing system shown in FIG. 5, will be described with reference to a block diagram shown in FIG. 6.

Note that the reason for showing the signal processing system in the state $\phi$-3 as an example of the signal processing system shown in FIG. 5 is that the signal processing system in the state $\phi$-3 includes the configurations of the signal processing system in the states $\phi$-1 and $\phi$-2. Furthermore, even when a signal processing system is configured using four or more signal processing devices as in the case of the signal processing system in the state $\phi$-4, the signal processing system can be described as in the case of the signal processing system in the state $\phi$-3.

Figure 6:
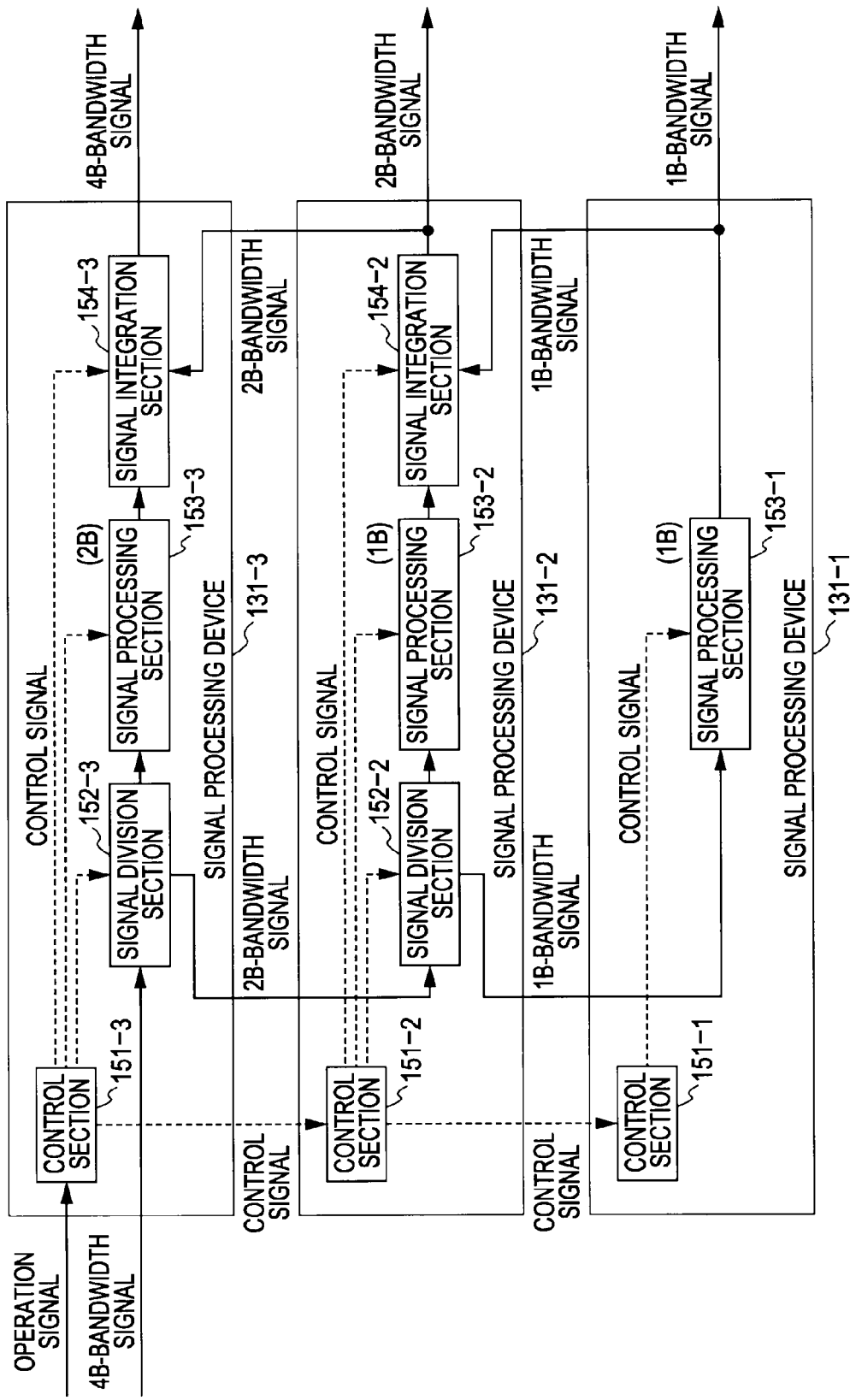
FIG. 6 is a diagram showing a specific example of the configuration of the signal processing system shown in FIG. 5.

The signal processing device 131-1 shown in FIG. 6 includes a control section 151-1 and a signal processing section 153-1. The signal processing device 131-2 includes a control section 151-2, a signal division section 152-2, a signal processing section 153-2, and a signal integration section 154-2. The signal processing device 131-3 includes a control section 151-3, a signal division section 152-3, a signal processing section 153-3, and a signal integration section 154-3.

Here, numbers following hyphens (-) in representations using numbers that denote the respective sections which constitute the signal processing devices 131-1 to 131-3 correspond to numbers following hyphens in representations using numbers that denote the respective signal processing devices 131-1 to 131-3. In other words, since the signal processing device 131-1 does not have any signal division section or any signal integration section, a signal division section 152-1 and a signal integration section 154-1 do not exist.

The control section 151-1 of the signal processing device 131-1 supplies a control signal to the signal processing section 153-1 in accordance with a control signal that is supplied from the control section 151-3 of the signal processing device 131-3 via the control section 151-2 of the signal processing device 131-2, and the control signal that is supplied from the control section 151-1 is provided as an instruction for a processing bandwidth at which the signal processing section 153-1 is to perform signal processing on one of signals that are obtained by dividing an input signal.

The signal processing section 153-1 performs, in accordance with the control signal that is supplied from the control section 151-1, predetermined signal processing on an input signal that is included in the input signal and that has a bandwidth which corresponds to a processing bandwidth according to the instruction provided by the control section 151-1. The signal processing section 153-1 supplies a processing result of performance of predetermined signal processing to the signal integration section 154-2 of the signal processing device 131-2.

The control section 151-2 of the signal processing device 131-2 supplies control signals to the signal division section 152-2 and the signal processing section 153-2 in accordance with a control signal that is supplied from the control section 151-3 of the signal processing device 131-3, and the control signals that are supplied from the control section 151-2 are provided as instructions for a processing bandwidth at which the signal processing section 153-2 is to perform signal processing on one of signals that are obtained by dividing the input signal. Furthermore, the control section 151-2 controls an operation of the signal integration section 154-2.

The signal division section 152-2 divides, in accordance with a corresponding one of the control signals that are supplied from the control section 151-2, an input signal that is supplied from the signal division section 152-3 of the signal processing device 131-3 into signals having a bandwidth that corresponds to the processing bandwidth at which the signal processing section 153-2 is to perform signal processing. The signal division section 152-2 supplies one of the divided signals to the signal processing section 153-2. Additionally, the signal division section 152-2 supplies, to the signal processing section 153-1 of the signal processing device 131-1, the remaining input signal having a bandwidth that corresponds to the processing bandwidth, which is obtained by dividing the input signal that is supplied from the signal division section 152-3.

The signal processing section 153-2 performs, in accordance with a corresponding one of the control signals that are supplied from the control section 151-2, predetermined signal processing on the input signal that is supplied from the signal division section 152-2. The signal processing section 153-2 supplies a processing result of performance of predetermined signal processing to the signal integration section 154-2.

The signal integration section 154-2 integrates, under control that is performed by the control section 151-2, the signal (the 1 B-bandwidth signal) that is supplied from the signal processing section 153-1 of the signal processing device 131-1 with the signal (the 1 B-bandwidth signal) that is supplied from the signal processing section 153-2, thereby obtaining a 2 B-bandwidth signal. The signal integration section 154-2 supplies the integrated 2 B-bandwidth signal to the signal integration section 154-3 of the signal processing device 131-3.

The control section 151-3 of the signal processing device 131-3 determines, in accordance with the operation signal that is supplied from an operation section (not illustrated) and that indicates a user operation and in accordance with processing capabilities of the signal processing sections 153-1 to 153-3, the processing bandwidths at which the signal processing sections 153-1 to 153-3 are to perform signal processing on the input signal. The control section 151-3 supplies, to the control sections 151-1 and 151-2, the signal division section 152-3, and the signal processing section 153-3, the control signals for instructing the signal processing sections 153-1 to 153-3 to perform signal processing at the determined processing bandwidths. Furthermore, the control section 151-3 controls an operation of the signal integration section 154-3.

In other words, the control section 151-3 exercises overall control of the signal processing system. In this manner, in the signal processing system shown in FIG. 5, a control section of a newly added signal processing device (a signal processing device that is shown at the top in FIG. 5) controls control sections of the other signal processing devices, thereby exercising overall control of the signal processing system.

The signal division section 152-3 divides, in accordance with a corresponding one of the control signals that are supplied from the control section 151-3, the input signal into signals having a bandwidth that corresponds to the processing bandwidth at which the signal processing section 153-3 is to perform signal processing. The signal division section 152-3 supplies one of the divided signals to the signal processing section 153-3. Additionally, the signal division section 152-3 supplies, to the signal division section 152-2 of the signal processing device 131-2, the remaining input signal having a bandwidth that corresponds to the processing bandwidth, which is obtained by dividing the input signal.

The signal processing section 153-3 performs, in accordance with a corresponding one of the control signals that are supplied from the control section 151-3, predetermined signal processing on the input signal that is supplied from the signal division section 152-3. The signal processing section 153-3 supplies a processing result of performance of predetermined signal processing to the signal integration section 154-3.

The signal integration section 154-3 integrates, under control that is performed by the control section 151-3, the signal (the 2 B-bandwidth signal) that is supplied from the signal processing section 153-2 of the signal processing device 131-2 with the signal (the 2 B-bandwidth signal) that is supplied from the signal processing section 153-3, thereby obtaining a 4 B-bandwidth signal. The signal integration section 154-3 outputs the 4 B-bandwidth signal.

Figure 7:
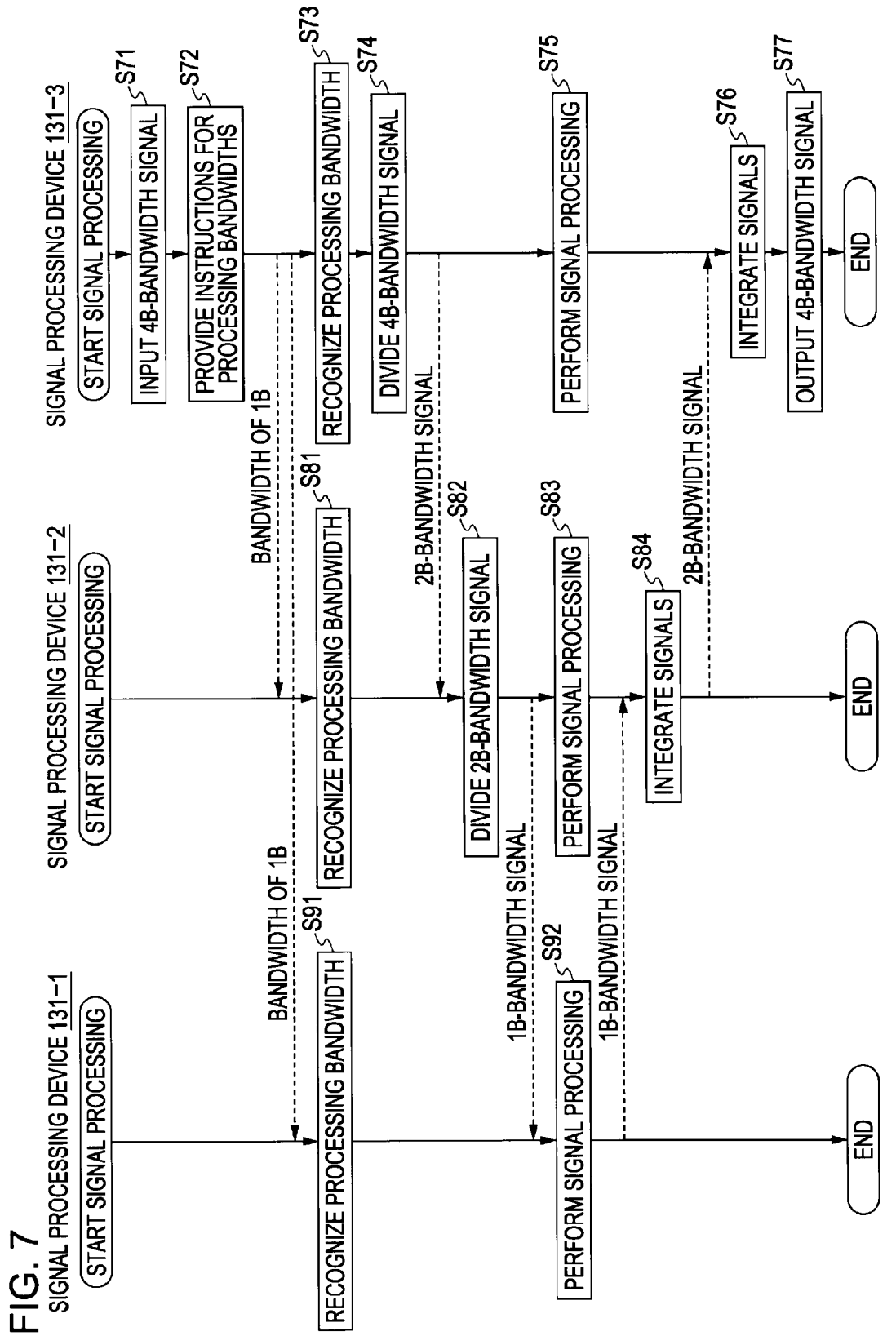
FIG. 7 is a flowchart for explaining signal processing that is performed in the signal processing system shown in FIG. 6.

Next, signal processing that is performed in the signal processing system shown in FIG. 6 will be described with reference to a flowchart shown in FIG. 7.

In step S71, an input section (not illustrated) of the signal processing device 131-3 inputs a 4 B-bandwidth signal.

In step S72, the control section 151-3 of the signal processing device 131-3 determines, in accordance with the operation signal that is supplied from the operation section (not illustrated) and that indicates a user operation and in accordance with the processing capabilities of the signal processing sections 153-1 to 153-3 in the signal processing system, processing bandwidths at which the signal processing sections 153-1 to 153-3 are to perform signal processing in such a manner that the signal processing sections 153-1 to 153-3 share signal processing. The control section 151-3 provides instructions for the determined processing bandwidths to the related sections. More specifically, the control section 151-3 determines that the signal processing sections 153-1 to 153-3 are to perform signal processing on the input 4 B-bandwidth signal at processing bandwidths of 1 B, 1 B, and 2 B, respectively. The control section 151-3 supplies control signals indicating the determined processing bandwidths to the control sections 151-1 and 151-2, the signal division section 152-3, and the signal processing section 153-3.

In step S73, the signal division section 152-3 recognizes, in accordance with a corresponding one of the control signals that are supplied from the control section 151-3, the processing bandwidth of 2 B at which the signal processing section 153-3 is to perform signal processing.

In step S74, the signal division section 152-3 divides the 4 B-bandwidth signal that is an input signal into signals having a bandwidth that corresponds to the recognized processing bandwidth of 2 B, and supplies one of the divided signals to the signal processing section 153-3. Additionally, the signal division section 152-3 supplies the remaining input signal having a bandwidth that corresponds to the processing bandwidth of 2 B, which is obtained by dividing the 4 B-bandwidth signal that is an input signal, to the signal division section 152-2 of the signal processing device 131-2.

In step S75, the signal processing section 153-3 performs, in accordance with a corresponding one of the control signals that are supplied from the control section 151-3, predetermined signal processing on the input signal (the 2 B-bandwidth signal) that is supplied from the signal division section 152-3, and supplies a processing result of performance of predetermined signal processing to the signal integration section 154-3.

In step S81, the control section 151-2 of the signal processing device 131-2 recognizes, in accordance with a corresponding one of the control signals that are supplied from the control section 151-3 of the signal processing device 131-3, the processing bandwidth of 2 B at which the signal processing section 153-2 is to perform signal processing. The control section 151-2 supplies control signals indicating the recognized processing bandwidth of 2 B to the signal division section 152-2 and the signal processing section 153-2.

In step S82, the signal division section 152-2 divides, in accordance with a corresponding one of the control signals that are supplied from the control section 151-2, the input signal (the 2 B-bandwidth signal) that is supplied from the signal division section 152-2 into signals having a bandwidth that corresponds to the processing bandwidth of 1 B at which the signal processing section 153-2 is to perform signal processing, and supplies one of the divided signals to the signal processing section 153-2. Additionally, the signal division section 152-2 supplies the remaining input signal having a bandwidth that corresponds to the processing bandwidth of 1 B, which is obtained by dividing the 2 B-bandwidth signal, to the signal processing section 153-1 of the signal processing device 131-1.

In step S83, the signal processing section 153-2 performs, in accordance with a corresponding one of the control signals that are supplied from the control section 151-2, predetermined signal processing on the input signal (the 1 B-bandwidth signal) that is supplied from the signal division section 152-2, and supplies a processing result of performance of predetermined signal processing to the signal integration section 154-2.

In step S91, the control section 151-1 of the signal processing device 131-1 recognizes, in accordance with the control signal that is supplied from the control section 151-3 of the signal processing device 131-3 via the control section 151-2 of the signal processing device 131-2, the processing bandwidth of 1 B at which the signal processing section 153-1 is to perform signal processing. The control section 151-1 supplies a control signal indicating the recognized processing bandwidth of 1 B to the signal processing section 153-1.

In step S92, the signal processing section 153-1 performs, in accordance with the control signal that is supplied from the control section 151-1, predetermined signal processing on the input signal (the 1 B-bandwidth signal) that is supplied from the signal division section 152-2, and supplies a processing result of performance of predetermined signal processing to the signal integration section 154-2 of the signal processing device 131-2.

In step S84, the signal integration section 154-2 integrates, under control that is performed by the control section 151-2, the signal (the 1 B-bandwidth signal) that is supplied from the signal processing section 153-1 of the signal processing device 131-1 with the signal (the 1 B-bandwidth signal) that is supplied from the signal processing section 153-2, thereby obtaining a 2 B-bandwidth signal. The signal integration section 154-2 supplies the integrated 2 B-bandwidth signal to the signal integration section 154-3 of the signal processing device 131-3.

In step S76, the signal integration section 154-3 integrates, under control that is performed by the control section 151-3, the signal (the 2 B-bandwidth signal) that is supplied from the signal processing section 153-2 of the signal processing device 131-2 with the signal (the 2 B-bandwidth signal) that is supplied from the signal processing section 153-3, thereby obtaining a 4 B-bandwidth signal.

In step S77, the signal integration section 154-3 outputs the 4 B-bandwidth signal that is integrated in step S76.

According to the above-described process, signal processing is performed on an input signal having a bandwidth of 4 B in accordance with the processing capabilities of the respective signal processing devices 131-1 to 131-3, and an output signal having a bandwidth of 4 B can be output.

Thus, in the signal processing system shown in FIG. 6, an output signal having a bandwidth of 4 B can be output for an input signal having a bandwidth of 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase the bandwidths of an input signal and an output signal, increasing of the bandwidths of an input signal and an output signal can be supported without discarding existing systems that do not have processing capabilities corresponding to the necessary bandwidths.

Note that the processing bandwidths at which the signal processing sections 153-1 to 153-3 are to perform signal processing, which are determined by the control section 151-3, are not limited to the above-described values. Other values in ranges of bandwidths at which the signal processing sections 153-1 to 153-3 can perform signal processing may be used.

In the above description, the signal processing system in the state φ-3 shown in FIG. 5 is described. However, signal processing which is similar to that illustrated in FIG. 7 can also be performed in the signal processing system in the state φ-2 or φ-4 shown in FIG. 5 by applying a configuration which is similar to that shown in FIG. 6. Furthermore, even when the number of signal processing devices that constitute a signal processing system is five or more, the signal processing system can be described as in the case given above.

Moreover, in the above description, in step S84, the signal processing device 131-2 supplies the 2 B-bandwidth signal to the signal processing device 131-3. However, the signal processing device 131-2 can output the 2 B-bandwidth signal without further performing signal processing on the 2 B-bandwidth signal. Similarly, in the signal processing system in the state φ-4 shown in FIG. 5, the signal processing device 131-2 can output the 2 B-bandwidth signal without further performing signal processing on the 2 B-bandwidth signal, and the signal processing device 131-3 can output the 4 B-bandwidth signal without further performing signal processing on the 4 B-bandwidth signal.

A configuration has been described above, in which increasing of the bandwidths of an input signal and an output signal is supported. However, increasing of only the bandwidth of an input signal may also be supported.

Figure 8:
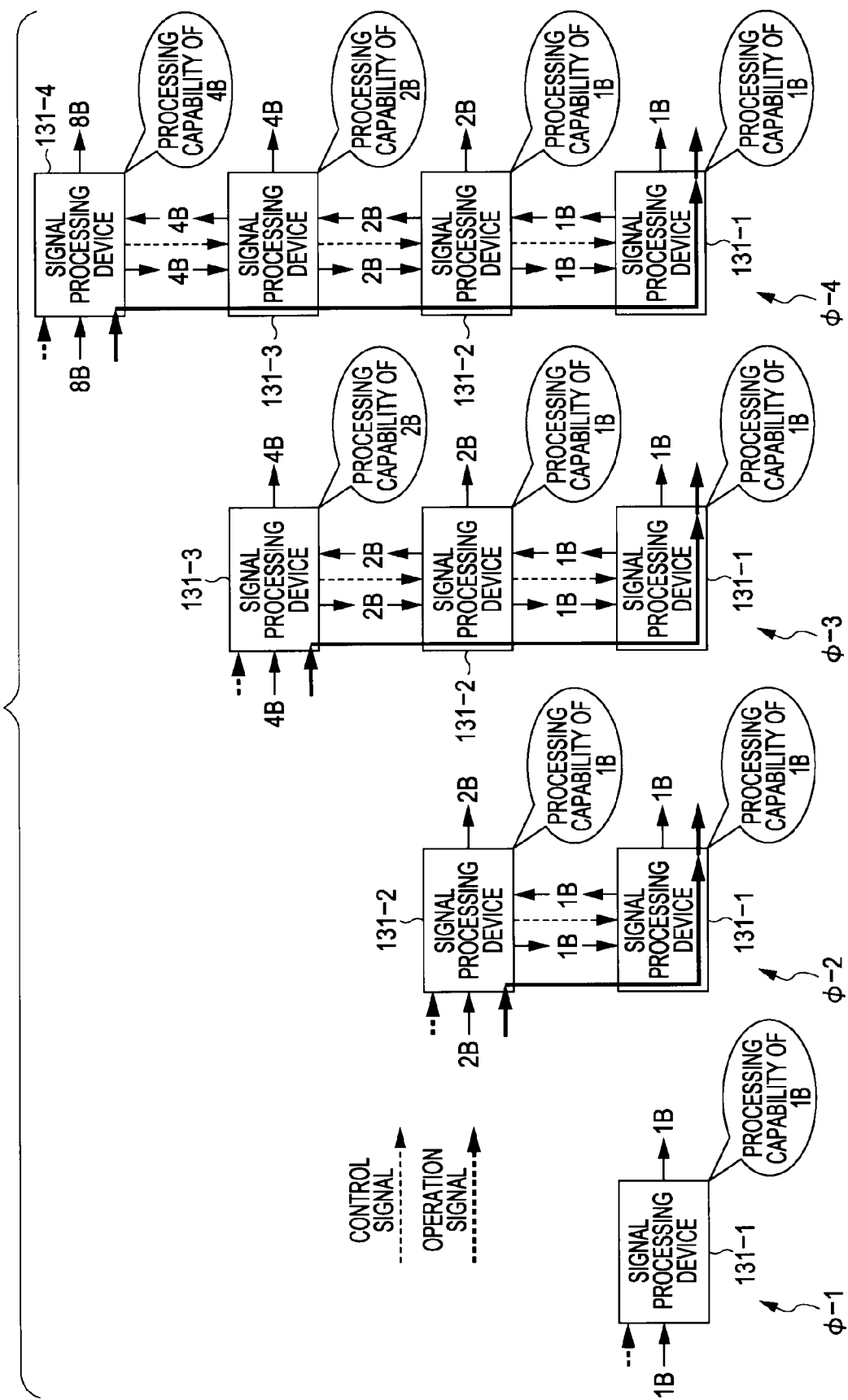
FIG. 8 is a diagram showing further another example of the configuration of the signal processing system.

FIG. 8 shows an example of a configuration of a signal processing system in which increasing of only the bandwidth of an input signal is supported.

The signal processing system in states φ-1 to φ-4 shown in FIG. 8 has a configuration which is similar to that of the signal processing system which is described with reference to FIG. 5.

As shown using thick lines in FIG. 8, the signal processing system shown in FIG. 8 divides an input signal that is input to any one of the signal processing devices which constitute the signal processing system into signals. A predetermined signal processing device performs signal processing at a narrow bandwidth on the divided signals, thereby obtaining signals, and outputs the signals.

Here, an outline of signal processing that is performed in the signal processing system in the states φ-1 to φ-4 shown in FIG. 8 is described.

Because the signal processing system in the state φ-1 shown in FIG. 8 performs an operation which is similar to that of the signal processing system in the state φ-1 shown in FIG. 5, a description thereof is omitted.

In the signal processing system in the state φ-2 shown in FIG. 8, the signal processing devices 131-1 and 131-2 divide an input signal that is input to the signal processing device 131-2 into signals, and perform signal processing on the divided signals in accordance with an operation signal that is input to the signal processing device 131-2 and a control signal (indicated by a thin broken line in FIG. 5) based on the operation signal. In other words, the signal processing device 131-2 divides, in accordance with the operation signal, a 2 B-bandwidth signal that is the input signal into 1 B-bandwidth signals. The signal processing device 131-1 performs, in accordance with the control signal, signal processing on the divided 1 B-bandwidth signals, thereby obtaining 1 B-bandwidth signals, and outputs the 1 B-bandwidth signals as output signals.

With this configuration, the signal processing system in the state φ-2 can perform signal processing in accordance with the processing capability (1 B) of the predetermined signal processing device on an input signal having a bandwidth of 2 B, and can output output signals having a bandwidth of 1 B.

In the signal processing system in the state φ-3 shown in FIG. 8, the signal processing devices 131-1 to 131-3 divide an input signal that is input to the signal processing device 131-3 into signals, and perform signal processing on the divided signals in accordance with an operation signal that is input to the signal processing device 131-3 and control signals based on the operation signal. In other words, the signal processing device 131-3 divides, in accordance with the operation signal, a 4 B-bandwidth signal that is the input signal into 2 B-bandwidth signals. The signal processing device 131-2 further divides, in accordance with a corresponding one of the control signals, the 2 B-bandwidth signals, which are obtained by diving the 4 B-bandwidth signal, into 1 B-bandwidth signals. The signal processing device 131-1 performs, in accordance with a corresponding one of the control signals, signal processing on the 1 B-bandwidth signals that are obtained by further dividing the 2 B-bandwidth signals, thereby obtaining 1 B-bandwidth signals, and outputs the 1 B-bandwidth signals as output signals.

With this configuration, the signal processing system in the state φ-3 can perform signal processing in accordance with the processing capability (1 B) of the predetermined signal processing device on an input signal having a bandwidth of 4 B, and can output output signals having a bandwidth of 1 B.

In the signal processing system in the state φ-4 shown in FIG. 8, the signal processing devices 131-1 to 131-4 divide an input signal that is input to the signal processing device 131-4 into signals, and perform signal processing on the divided signals in accordance with an operation signal that is input to the signal processing device 131-4 and control signals based on the operation signal. In other words, the signal processing device 131-4 divides, in accordance with the operation signal, an 8 B-bandwidth signal that is the input signal into 4 B-bandwidth signals. The signal processing device 131-3 further divides, in accordance with a corresponding one of the control signals, the 4 B-bandwidth signals, which are obtained by diving the 8 B-bandwidth signal, into 2 B-bandwidth signals. The signal processing device 131-2 further divides, in accordance with a corresponding one of the control signals, the 2 B-bandwidth signals, which are obtained by diving the 4 B-bandwidth signals, into 1 B-bandwidth signals. The signal processing device 131-1 performs, in accordance with a corresponding one of the control signals, signal processing on the 1 B-bandwidth signals that are obtained by further divid-ing the 2 B-bandwidth signals, thereby obtaining 1 B-bandwidth signals, and outputs the 1 B-bandwidth signals as output signals.

With this configuration, the signal processing system in the state φ-4 can perform signal processing in accordance with the processing capability (1 B) of the predetermined signal processing device on an input signal having a bandwidth of 8 B, and can output output signals having a bandwidth of 1 B.

Figure 9:
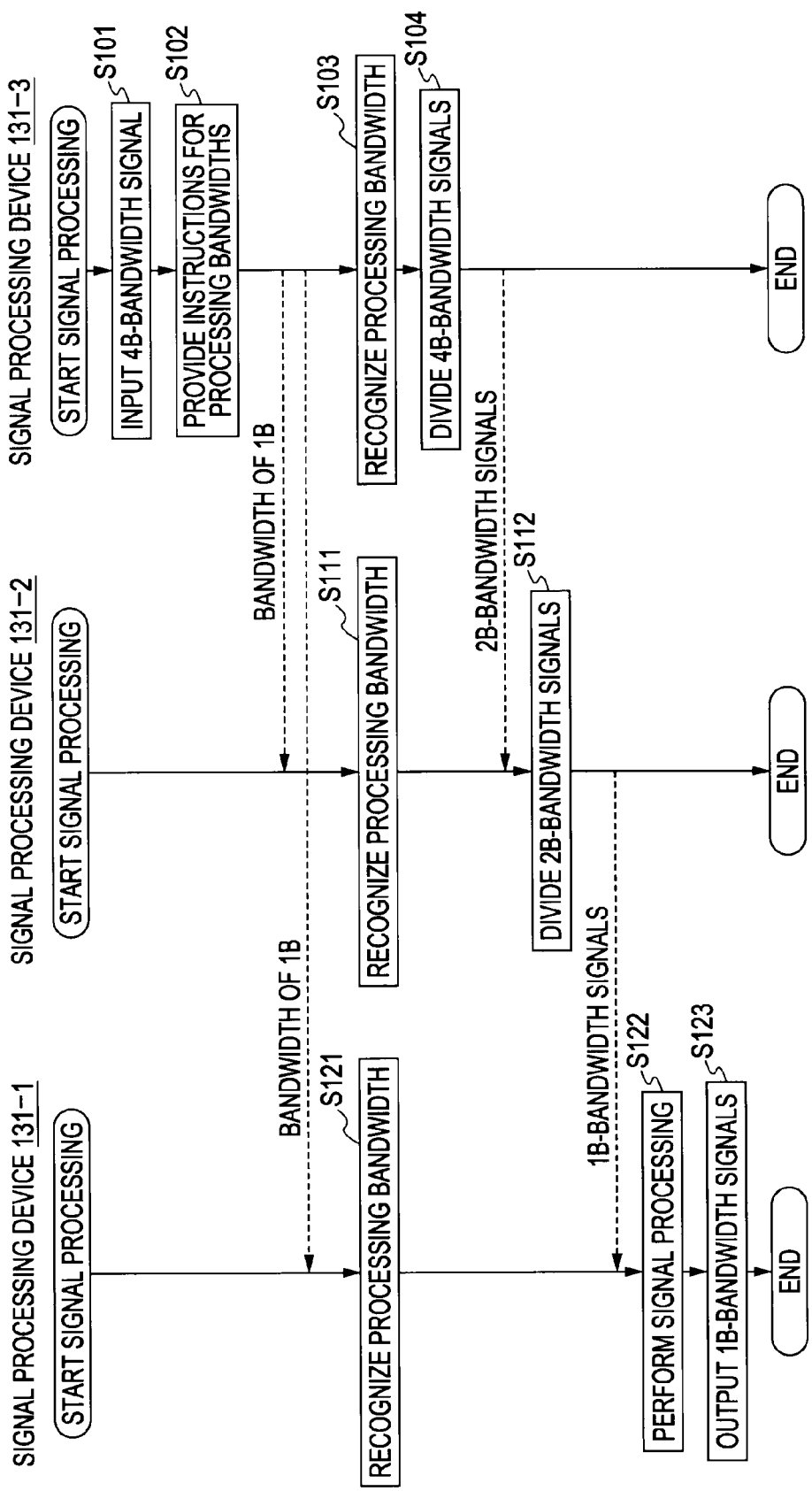
FIG. 9 is a flowchart for explaining signal processing that is performed in the signal processing system shown in FIG. 8.

Next, signal processing that is performed in the signal processing system in the state φ-3 shown in FIG. 8 will be described with reference to a flowchart shown in FIG. 9. Note that, because a specific example of the configuration of the signal processing system in the state φ-3 shown in FIG. 8 is similar to the configuration that is shown in the block diagram of FIG. 6, a description thereof is omitted. In step S101, the input section (not illustrated) of the signal processing device 131-3 inputs a 4 B-bandwidth signal.

In step S102, the control section 151-3 of the signal processing device 131-3 determines, in accordance with the operation signal that is supplied from the operation section (not illustrated) and that indicates a user operation and in accordance with the processing capabilities of the signal processing sections 153-1 to 153-3 in the signal processing system, a processing bandwidth at which the predetermined signal processing device is to perform signal processing. The control section 151-3 provides instructions for the determined processing bandwidth to the related sections. More specifically, the control section 151-3 determines that only the signal processing section 153-1 is to perform signal processing on the input 4 B-bandwidth signal at a processing bandwidth of 1 B. The control section 151-3 supplies control signals indicating the determined processing bandwidth to the control sections 151-1 and 151-2, and the signal division section 152-3.

In step S103, the signal division section 152-3 recognizes, in accordance with a corresponding one of the control signals that are supplied from the control section 151-3, the processing bandwidth of 1 B at which the signal processing section 153-1 is to perform signal processing. In this case, in addition, the signal division section 152-3 also recognizes that the signal processing section 153-3 is not to perform signal processing.

In step S104, the signal division section 152-3 divides the 4 B-bandwidth signal that is an input signal into signals having a bandwidth that corresponds to a processing bandwidth of 2 B, and supplies the 2 B-bandwidth signals to the signal division section 152-2 of the signal processing device 131-2.

In step S111, the control section 151-2 of the signal processing device 131-2 recognizes, in accordance with a corresponding one of the control signals that are supplied from the control section 151-3 of the signal processing device 131-3, the processing bandwidth of 1 B at which the signal processing section 153-1 is to perform signal processing. The control section 151-2 supplies a control signal indicating the recognized processing bandwidth of 1 B, to the signal division section 152-2. In addition, the control section 151-2 also recognizes that the signal processing section 153-2 is not to perform signal processing.

In step S112, the signal division section 152-2 divides, in accordance with the control signal that is supplied from the control section 151-2, the input signals (the 2 B-bandwidth signals) that are supplied from the signal division section 152-3 into signals having a bandwidth of 1 B that corresponds to the processing bandwidth of 1 B at which the signal processing section 153-1 is to perform signal processing, and supplies the 1 B-bandwidth signals to the signal processing section 153-1 of the signal processing device 131-1.

In step S121, the control section 151-1 of the signal processing device 131-1 recognizes, in accordance with the control signal that is supplied from the control section 151-3 of the signal processing device 131-3 via the control section 151-2 of the signal processing device 131-2, the processing bandwidth of 1 B at which the signal processing section 153-1 is to perform signal processing. The control section 151-1 supplies a control signal indicating the recognized processing bandwidth of 1 B to the signal processing section 153-1.

In step S122, the signal processing section 153-1 performs, in accordance with the control signal that is supplied from the control section 151-1, predetermined signal processing on the input signals (the 1 B-bandwidth signals) that are supplied from the signal division section 152-2, thereby obtaining 1 B-bandwidth signals.

In step S123, the signal processing section 153-1 outputs the 1 B-bandwidth signals that are obtained in step S122.

According to the above-described process, signal processing is performed on an input signal having a bandwidth of 4 B in accordance with the processing capability of the signal processing device 131-1, and output signals having a bandwidth of 1 B can be output.

Thus, in the signal processing system shown in FIG. 8, output signals having a bandwidth of 1 B can be output for an input signal having a bandwidth of 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase only the bandwidth of an input signal and a device on the output side does not support the necessary bandwidth, increasing of the bandwidth of an input signal can be supported without discarding existing systems.

In the above description, the signal processing system in the state φ-3 shown in FIG. 8 is described. However, signal processing which is similar to that illustrated in FIG. 7 can also be performed in the signal processing system in the state φ-2 or φ-4 shown in FIG. 8. Furthermore, even when the number of signal processing devices that constitute a signal processing system is five or more, the signal processing system can be described as in the case given above.

Moreover, in the above description, the signal processing device 131-1 outputs the 1 B-bandwidth signals. However, the signal processing device 131-2 may output the 2 B-bandwidth signals. Similarly, in the signal processing system in the state φ-4 shown in FIG. 8, the signal processing device 131-2 may output the 2 B-bandwidth signals, or the signal processing device 131-3 may output the 4 B-bandwidth signals.

A configuration in which increasing of the bandwidth of an output signal is supported, a configuration in which increasing of the bandwidths of an input signal and an output signal is supported, and a configuration in which increasing of the bandwidth of an input signal is supported have been described above. However, functions of the respective configurations can be realized together.

Figure 10:
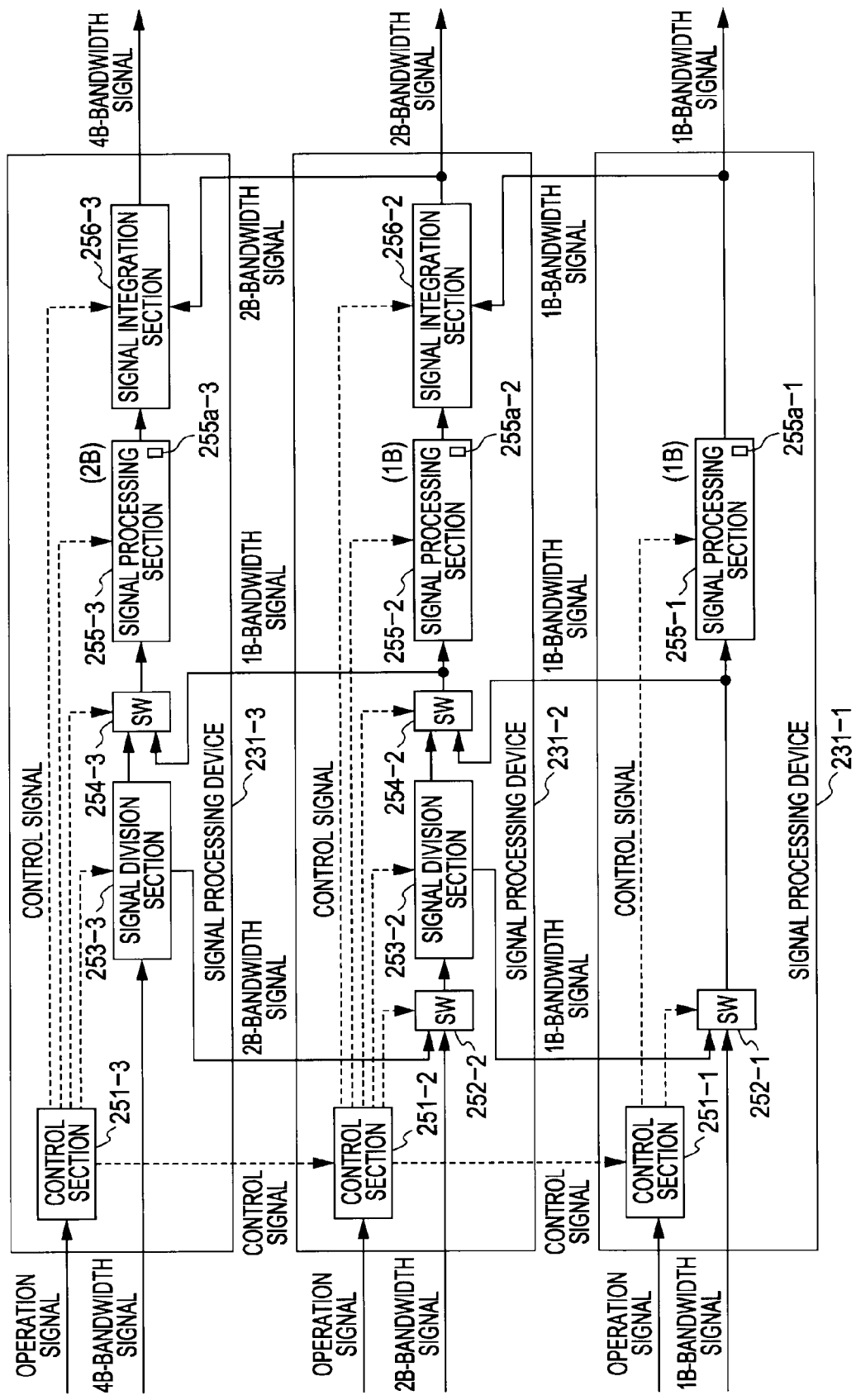
FIG. 10 is a diagram showing further another example of the configuration of the signal processing system.

FIG. 10 shows an example of a configuration of a signal processing system in which increasing of the bandwidth of an output signal, increasing of the bandwidths of an input signal and an output signal, and increasing of the bandwidth of an input signal are supported.

A signal processing device 231-1 shown in FIG. 10 includes a control section 251-1, a switch (SW) 252-1, and a signal processing section 255-1. A signal processing device 231-2 includes a control section 251-2, a SW 252-2, a signal division section 253-2, a SW 254-2, a signal processing section 255-2, and a signal integration section 256-2. A signal processing device 231-3 includes a control section 251-3, a signal division section 253-3, a SW 254-3, a signal processing section 255-3, and a signal integration section 256-3.

Here, numbers following hyphens (-) in representations using numbers that denote the respective sections which constitute the signal processing devices 231-1 to 231-3 correspond to numbers following hyphens in representations using numbers that denote the respective signal processing devices 231-1 to 231-3. In other words, for example, since the signal processing device 231-1 does not have any signal division section or any signal integration section, a signal division section 253-1 and a signal integration section 256-1 do not exist.

The control section 251-1 of the signal processing device 231-1 have functions that are similar to those of the control section 51-1 shown in FIG. 3 and the control section 151-1 shown in FIG. 6. In addition, the control section 251-1 controls the SW 252-1 in accordance with an operation signal that indicates a user operation or in accordance with a control signal that is supplied from another control section.

The SW 252-1 switches, as an input under control that is performed by the control section 251-1, between a 1 B-bandwidth signal that is supplied from an input section (not illustrated) and a 1 B-bandwidth signal that is supplied from the signal division section 253-2, and supplies one of the 1 B-bandwidth signals to the signal processing section 255-1. For example, when the signal processing system shown in FIG. 10 is set in accordance with the operation signal to be in a mode in which increasing of the bandwidth of an output signal is supported, the SW 252-1 inputs the 1 B-bandwidth signal that is supplied from the input section (not illustrated). Furthermore, when the signal processing system is set to be in a mode in which increasing of the bandwidths of an input signal and an output signal is supported or a mode in which increasing of only the bandwidth of an input signal is supported, the SW 252-1 inputs the 1 B-bandwidth signal that is supplied from the signal division section 253-2.

The signal processing section 255-1 performs, in accordance with a control signal that is supplied from the control section 251-1, predetermined signal processing on the 1 B-bandwidth signal that is input from the SW 252-1. The signal processing section 255-1 supplies the 1 B-bandwidth signal, which was subjected to predetermined signal processing, to the signal integration section 256-2 of the signal processing device 231-2 or outputs the 1 B-bandwidth signal to an external device. Note that, when the signal processing system shown in FIG. 10 is set in accordance with the operation signal to be in the mode in which increasing of the bandwidth of an output signal is supported, an amplifier unit 255a-1 that is included in the signal processing section 255-1 amplifies a processing result of performance of signal processing so that the result can have a bandwidth (of 1 B) which corresponds to the upper limit of a processing capability of the signal processing section 255-1, thereby obtaining a 1 B-bandwidth signal. The signal processing section 255-1 outputs the 1 B-bandwidth signal to the signal integration section 256-2.

The control section 251-2 of the signal processing device 231-2 have functions that are similar to those of the control section 51-2 shown in FIG. 3 and the control section 151-2 shown in FIG. 6. In addition, the control section 251-2 controls the SWs 252-2 and 254-2 in accordance with an operation signal that indicates a user operation or a control signal that is supplied from another control section.

The SW 252-2 switches, as an input under control that is performed by the control section 251-2, between a 2 B-bandwidth signal that is supplied from an input section (not illustrated) and a 2 B-bandwidth signal that is supplied from the signal division section 253-3, and supplies one of the 2 B-bandwidth signals to the signal division section 253-2. For example, in a case in which the signal processing system shown in FIG. 10 is set in accordance with the operation signal to be in the mode in which increasing of the bandwidths of an input signal and an output signal is supported or the mode in which increasing of only the bandwidth of an input signal is supported, when an input signal that is input to the signal processing system is a 2 B-bandwidth signal, the SW 252-2 inputs the 2 B-bandwidth signal that is supplied from the input section (not illustrated). Furthermore, in a case in which the signal processing system is set to be in the mode in which increasing of the bandwidths of an input signal and an output signal is supported or the mode in which increasing of only the bandwidth of an input signal is supported, when an input signal that is input to the signal processing system is, for example, a 4 B-bandwidth signal, the SW 252-2 inputs the 2 B-bandwidth signal that is supplied from the signal division section 253-3.

When the signal processing system shown in FIG. 10 is set, under control that is performed by the control section 251-2, to be in the mode in which increasing of the bandwidths of an input signal and an output signal is supported or the mode in which increasing of only the bandwidth of an input signal is supported, the signal division section 253-2 divides the input signal (the 2 B-bandwidth signal) that is supplied from the SW 252-2 into signals having a bandwidth that corresponds to a processing bandwidth of 1 B at which the signal processing section 255-2 is to perform signal processing, and supplies one of the divided signals to the SW 254-2. Additionally, the signal division section 253-2 supplies, to the SW 252-1 of the signal processing device 231-1, the remaining input signal having a bandwidth that corresponds to the processing bandwidth of 1 B, which is obtained by dividing the input signal that is supplied from the SW 252-2.

The SW 254-2 switches, as an input under control that is performed by the control section 251-2, between a 1 B-bandwidth signal that is distributed from the signal processing device 231-1 and the 1 B-bandwidth signal that is supplied from the signal division section 253-2, and supplies one of the 1 B-bandwidth signals to the signal processing section 255-2. For example, when the signal processing system shown in FIG. 10 is set in accordance with the operation signal to be in the mode in which increasing of the bandwidth of an output signal is supported, the SW 254-2 inputs the 1 B-bandwidth signal that is distributed from the signal processing device 231-1. Furthermore, when the signal processing system is set to be in the mode in which increasing of the bandwidths of an input signal and an output signal is supported, the SW 254-2 inputs the 1 B-bandwidth signal that is supplied from the signal division section 253-2. Note that, the signal processing system is set to be in the mode in increasing of only the bandwidth of an input signal is supported, the SW 254-2 does not input the 1 B-bandwidth signal that is supplied from the signal division section 253-2.

The signal processing section 255-2 performs, in accordance with a control signal that is supplied from the control section 251-2, predetermined signal processing on the input signal (the 1 B-bandwidth signal) that is supplied from the SW 252-2. The signal processing section 255-2 supplies, to the signal integration section 256-2, the 1 B-bandwidth signal that was subjected to predetermined signal processing. Note that, when the signal processing system shown in FIG. 10 is set in accordance with the operation signal to be in the mode in which increasing of the bandwidth of an output signal is supported, an amplifier unit 255a-2 that is included in the signal processing section 255-2 amplifies a processing result of performance of signal processing so that the result can have a bandwidth (of 1 B) which corresponds to the upper limit of a processing capability of the signal processing section 255-2, thereby obtaining a 1 B-bandwidth signal. The signal processing section 255-2 supplies the 1 B-bandwidth signal to the signal integration section 256-2.

The signal integration section 256-2 integrates, under control that is performed by the control section 251-2, the signal (the 1 B-bandwidth signal) that is supplied from the signal processing section 255-1 of the signal processing device 231-1 with the signal (the 1 B-bandwidth signal) that is supplied from the signal processing section 255-2, thereby obtaining a 2 B-bandwidth signal. The signal integration section 256-2 supplies the 2 B-bandwidth signal to the signal integration section 256-3 of the signal processing device 231-3, or outputs the 2 B-bandwidth signal to an external device.

The control section 251-3 of the signal processing device 231-3 have functions that are similar to those of the control section 51-3 shown in FIG. 3 and the control section 151-3 shown in FIG. 6. In addition, the control section 251-3 controls the SW 254-3 in accordance with an operation signal that indicates a user operation or a control signal that is supplied from another control section.

When the signal processing system shown in FIG. 10 is set, under control that is performed by the control section 251-3, to be in the mode in which increasing of the bandwidths of an input signal and an output signal is supported or the mode in which increasing of only the bandwidth of an input signal is supported, the signal division section 253-3 divides an input signal (a 4 B-bandwidth signal) that is input from an input section (not illustrated) into signals having a bandwidth that corresponds to a processing bandwidth of 2 B at which the signal processing section 255-3 is to perform signal processing, and supplies one of the divided signals to the SW 254-3. Additionally, the signal division section 253-3 supplies, to the SW 252-2 of the signal processing device 231-2, the remaining input signal having a bandwidth that corresponds to the processing bandwidth of 2 B, which is obtained by dividing the input signal.

The SW 254-3 switches, as an input under control that is performed by the control section 251-3, between a 1 B-bandwidth signal that is distributed from the signal processing device 231-2 and the 2 B-bandwidth signal that is supplied from the signal division section 253-3, and supplies one of the 1 B-bandwidth signal and the 2 B-bandwidth signal to the signal processing section 255-3. For example, when the signal processing system shown in FIG. 10 is set in accordance with the operation signal to be in the mode in which increasing of the bandwidth of an output signal is supported, the SW 254-3 inputs the 1 B-bandwidth signal that is distributed from the signal processing device 231-2. Furthermore, when the signal processing system is set to be in the mode in which increasing of the bandwidths of an input signal and an output signal is supported, the SW 254-3 inputs the 2 B-bandwidth signal that is supplied from the signal division section 253-3. Note that, the signal processing system is set to be in the mode in increasing of only the bandwidth of an input signal is supported, the SW 254-3 does not input the 2 B-bandwidth signal that is supplied from the signal division section 253-3.

The signal processing section 255-3 performs, in accordance with a control signal that is supplied from the control section 251-3, predetermined signal processing on the input signal that is supplied from the SW 254-3. The signal processing section 255-3 supplies, to the signal integration section 256-3, the input signal that was subjected to predetermined signal processing. Note that, when the signal processing system shown in FIG. 10 is set in accordance with the operation signal to be in the mode in which increasing of the bandwidth of an output signal is supported, an amplifier unit 255a-3 that is included in the signal processing section 255-3 amplifies a processing result of performance of signal processing so that the result can have a bandwidth (of 2 B) which corresponds to the upper limit of a processing capability of the signal processing section 255-3, thereby obtaining a 2 B-bandwidth signal. The signal processing section 255-3 supplies the 2 B-bandwidth signal to the signal integration section 256-3.

The signal integration section 256-3 integrates, under control that is performed by the control section 251-3, the signal (the 2 B-bandwidth signal) that is supplied from the signal processing section 255-2 of the signal processing device 231-2 with the signal (the 2 B-bandwidth signal) that is supplied from the signal processing section 255-3, thereby obtaining a 4 B-bandwidth signal. The signal integration section 256-3 outputs the 4 B-bandwidth signal.

With this configuration, any of increasing of the bandwidth of an output signal, increasing of the bandwidths of an input signal and an output signal, and increasing of only the bandwidth of an input signal can be supported.

Note that, in the signal processing system shown in FIG. 10, signal processing in which increasing of the bandwidth of an output signal is supported is performed as in the case of signal processing that is performed in the signal processing system shown in FIG. 3, which has been described with reference to the flowchart shown in FIG. 4, other than switching between the inputs with the SWs 252-1 and 252-2, and the SWs 254-2 and 254-3. Accordingly, a description thereof is omitted.

Thus, also in the signal processing system shown in FIG. 10, the bandwidth of an output signal can be increased to 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase the bandwidth of an output signal, increasing of the bandwidth of an output signal can be supported without discarding existing systems that do not have processing capabilities corresponding to the necessary bandwidths.

Additionally, in the signal processing system shown in FIG. 10, signal processing in which increasing of the bandwidths of an input signal and an output signal is supported is performed as in the case of signal processing that is performed in the signal processing system shown in FIG. 6, which has been described with reference to the flowchart shown in FIG. 7, other than switching between the inputs with the SWs 252-1 and 252-2, and the SWs 254-2 and 254-3. Accordingly, a description thereof is omitted.

Thus, also in the signal processing system shown in FIG. 10, an output signal having a bandwidth of 4 B can be output for an input signal having a bandwidth of 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase the bandwidths of an input signal and an output signal, increasing of the bandwidths of an input signal and an output signal can be supported without discarding existing systems that do not have processing capabilities corresponding to the necessary bandwidths.

Moreover, in the signal processing system shown in FIG. 10, signal processing in which increasing of only the bandwidth of an input signal is supported is performed as in the case of signal processing that is performed in the signal processing system shown in FIG. 6, which has been described with reference to the flowchart shown in FIG. 9, other than switching between the inputs with the SWs 252-1 and 252-2, and the SWs 254-2 and 254-3. Accordingly, a description thereof is omitted.

Thus, also in the signal processing system shown in FIG. 10, an output signal having a bandwidth of 4 B can be output for an input signal having a bandwidth of 4 B by using a combination of the signal processing devices having the processing capabilities corresponding to bandwidths of 1 B and 2 B without providing a signal processing device having a processing capability corresponding to a bandwidth of 4 B. As a result, even when it is necessary to increase only the bandwidth of an input signal and a device on the output side does not support the necessary bandwidth, increasing of the bandwidth of an input signal can be supported without discarding existing systems.

In the above description, a case in which the number of signal processing devices that constitute a signal processing system is three is described. However, even when the number of signal processing devices that constitute a signal processing system is two, four, or more, the signal processing system to which a configuration that is similar to that shown in FIG. 10 is applied can be described as in the case given above.

The signal processing system that performs predetermined signal processing on an input signal having a predetermined format, and that outputs an output signal has been described above. However, the above-described configuration can be applied to, for example, a television receiver.

Figure 11:
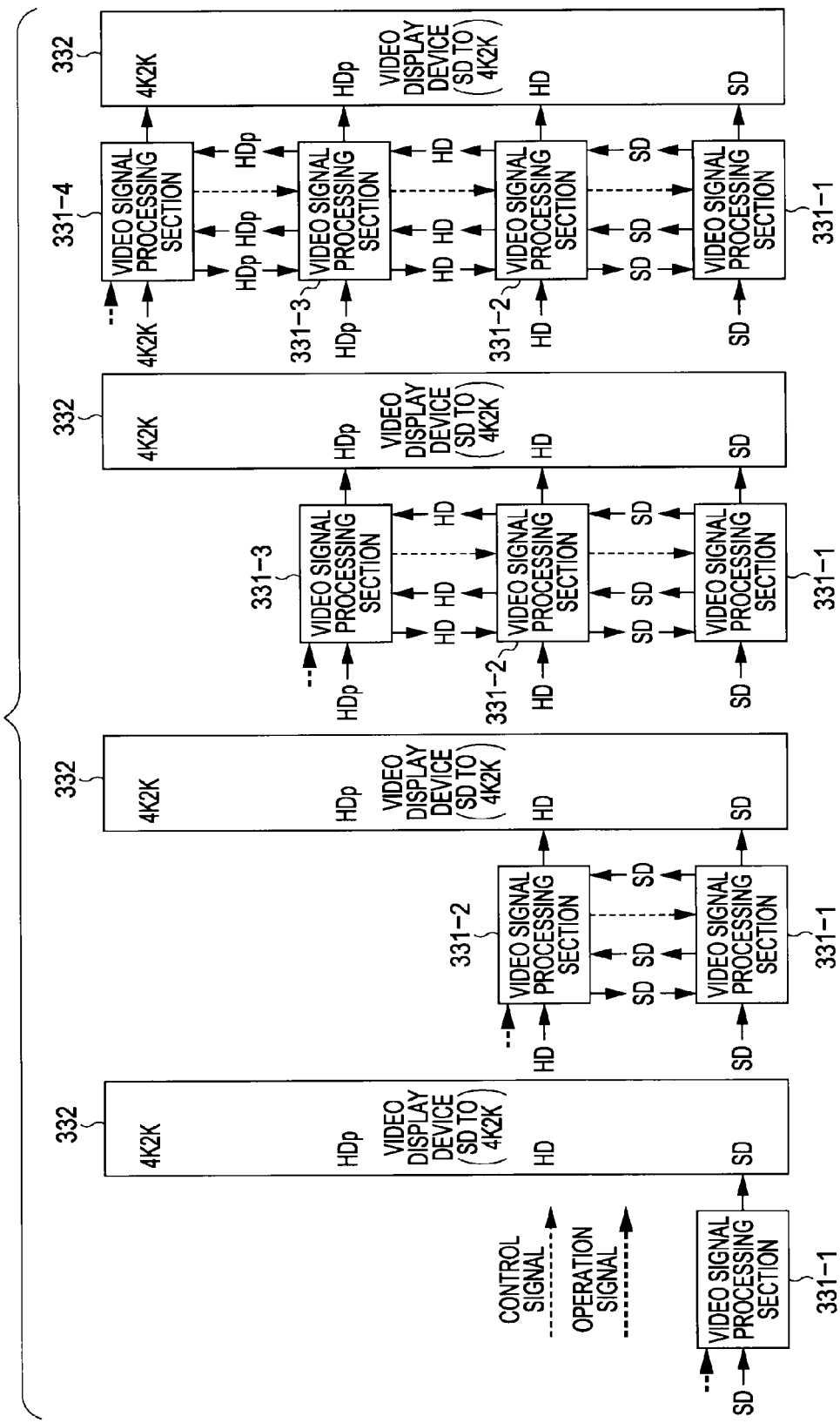
FIG. 11 is a diagram showing an example of a configuration of a television receiver according to an embodiment of the present invention.

FIG. 11 shows an example of a configuration of a television receiver according to an embodiment of the present invention.

In FIG. 11, the television receiver in four states is shown. The television receiver that is shown as the first one from the left in FIG. 11 is configured using a video signal processing section 331-1 and a video display device 332. The television receiver that is shown as the second one from the left in FIG. 11 is configured by adding a video signal processing section 331-2 to the television receiver that is shown as the first one from the left. The television receiver that is shown as the third one from the left in FIG. 11 is configured by adding a video signal processing section 331-3 to the television receiver that is shown as the second one from the left. The television receiver that is shown as the first one from the right in FIG. 11 is configured by adding a video signal processing section 331-4 to the television receiver that is shown as the third one from the left.

Referring to FIG. 11, the video signal processing section 331-1 can perform signal processing on a standard definition (SD) signal. When an SD signal is input, the video signal processing section 331-1 performs predetermined video signal processing on the SD signal in accordance with an operation signal (indicated by a thick broken line in FIG. 11) that is generated by performing a user operation, and outputs an SD signal.

The video signal processing section 331-2 can alone perform signal processing on an SD signal as in the case of the video signal processing section 331-1. When an SD signal is input, the video signal processing section 331-2 performs predetermined video signal processing on the SD signal in accordance with an operation signal that is generated by performing a user operation, and outputs an SD signal.

The video signal processing section 331-3 can alone perform signal processing on a high definition (HD) signal. When an HD signal is input, the video signal processing section 331-3 performs predetermined video signal processing on the HD signal in accordance with an operation signal that is generated by performing a user operation, and outputs an HD signal.

The video signal processing section 331-4 can alone perform signal processing on an HD progressive (HDp) signal. When an HDp signal is input, the video signal processing section 331-4 performs predetermined video signal processing on the HDp signal in accordance with an operation signal that is generated by performing a user operation, and outputs an HDp signal.

Furthermore, the video signal processing sections 331-1 to 331-4 shown in FIG. 11 correspond to the signal processing devices 31-1 to 31-4 shown in FIG. 1 and the signal processing devices 131-1 to 131-4 shown in FIG. 5, respectively. In other words, the television receiver shown in FIG. 11 basically has functions that are obtained by combining functions of the signal processing system shown in FIG. 1 with functions of the signal processing system shown in FIG. 5 other than performance of processing on a video signal. That is, the video signal processing sections 331-1 to 331-4 basically have configurations that are similar to those of the signal processing devices 231-1 to 231-3 which have been described with reference to FIG. 10 other than processing of a video signal. Thus, descriptions of the video signal processing sections 331-1 to 331-4 are omitted.

The video display device 332 is configured using, for example, a liquid crystal display, a plasma display, an electro luminescent (EL) display, or the like. The video display device 332 displays a video in accordance with an SD signal, an HD signal, an HDp signal, or a 4K2K signal (an pixel signal of 4096×2160 pixels), which is supplied from any one of the video signal processing sections 331-1 to 331-4.

Figure 12:
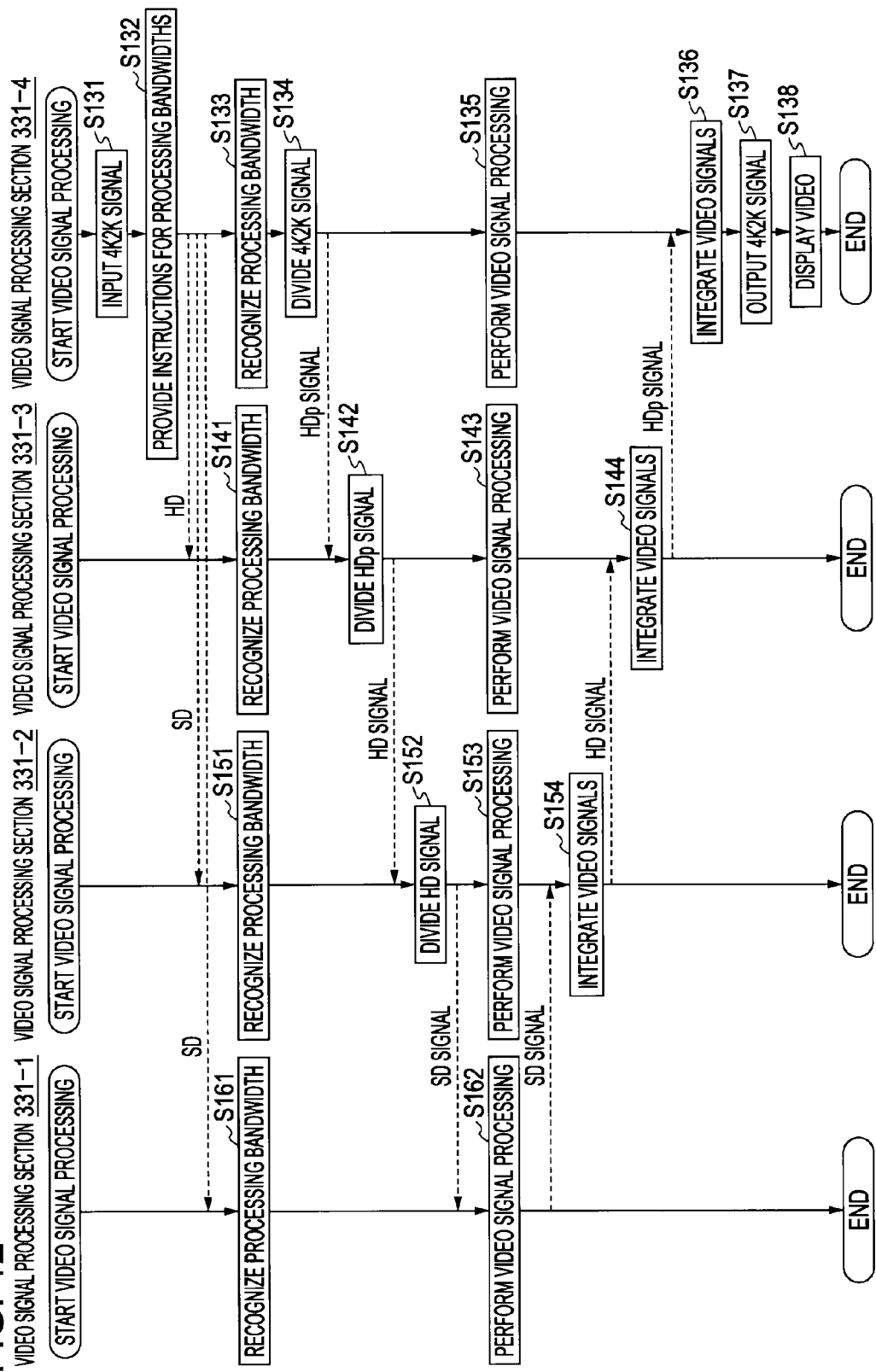
FIG. 12 is a flowchart for explaining video signal processing that is performed in the television receiver shown in FIG. 11.

Next, video signal processing in which increasing of the bandwidths of a video input signal and a video output signal is supported will be described with reference to a flowchart shown in FIG. 12 as an example of video signal processing that is performed in the television receiver shown in FIG. 11.

In step S131, the video signal processing section 331-4 inputs a 4K2K signal.

In step S132, the video signal processing section 331-4 determines, in accordance with the operation signal that indicates a user operation and in accordance with processing capabilities of the video signal processing sections 331-1 to 331-4 in the television receiver, processing bandwidths at which the video signal processing sections 331-1 to 331-4 are to perform signal processing in such a manner that the video signal processing sections 331-1 to 331-4 share signal processing. The video signal processing section 331-4 provides instructions for the determined processing bandwidths to the related sections. More specifically, the video signal processing section 331-4 determines that the video signal processing sections 331-1 to 331-4 are to perform signal processing on the input 4K2K signal at processing bandwidths which correspond to an SD signal, an SD signal, an HD signal, and an HDp signal, respectively. The video signal processing section 331-4 supplies control signals indicating the determined processing bandwidths to the video signal processing sections 331-1 to 331-4 including the video signal processing section 331-4.

In step S133, the video signal processing section 331-4 recognizes, in accordance with a corresponding one of the control signals, the processing bandwidth at which the video signal processing section 331-4 is to perform signal processing and which corresponds to an HDp signal.

In step S134, the video signal processing section 331-4 divides the 4K2K signal that is an input signal into signals having a bandwidth that corresponds to the recognized processing bandwidth corresponding to an HDp signal, thereby obtaining HDp signals. Additionally, the video signal processing section 331-4 supplies the remaining input signal having a bandwidth that corresponds to the processing bandwidth corresponding to an HDp signal, which is obtained by dividing the 4K2K signal that is an input signal, to the video signal processing section 331-3.

In step S135, the video signal processing section 331-4 performs predetermined video signal processing on the divided input signal (the HDp signal).

In step S141, the video signal processing section 331-3 recognizes, in accordance with a corresponding one of the control signals that are supplied from the video signal processing section 331-4, the processing bandwidth at which the video signal processing section 331-3 is to perform signal processing and which corresponds to an HD signal.

In step S142, the video signal processing section 331-3 divides the HDp signal that is supplied from the video signal processing section 331-4 and that is an input signal into signals having a bandwidth that corresponds to the recognized processing bandwidth corresponding to an HD signal, thereby obtaining HD signals. Additionally, the video signal processing section 331-3 supplies the remaining input signal having a bandwidth that corresponds to the processing bandwidth corresponding to an HD signal, which is obtained by dividing the HDp signal, to the video signal processing section 331-2.

In step S143, the video signal processing section 331-3 performs predetermined video signal processing on the divided input signal (the HD signal).

In step S151, the video signal processing section 331-2 recognizes, in accordance with a corresponding one of the control signals that are supplied from the video signal processing section 331-4, the processing bandwidth at which the video signal processing section 331-2 is to perform signal processing and which corresponds to an SD signal.

In step S152, the video signal processing section 331-2 divides the HD signal that is supplied from the video signal processing section 331-3 and that is an input signal into signals having a bandwidth that corresponds to the recognized processing bandwidth corresponding to an SD signal, thereby obtaining SD signals. Additionally, the video signal processing section 331-2 supplies the remaining input signal having a bandwidth that corresponds to the processing bandwidth corresponding to an SD signal, which is obtained by dividing the HD signal, to the video signal processing section 331-1.

In step S153, the video signal processing section 331-2 performs predetermined video signal processing on the divided input signal (the SD signal).

In step S161, the video signal processing section 331-1 recognizes, in accordance with a corresponding one of the control signals that are supplied from the video signal processing section 331-4, the processing bandwidth at which the video signal processing section 331-1 is to perform signal processing and which corresponds to an SD signal.

In step S162, the video signal processing section 331-1 performs predetermined video signal processing on the input signal (the SD signal) that is supplied from the video signal processing section 331-2. The video signal processing section 331-1 supplies a processing result of performance of predetermined video signal processing to the video signal processing section 331-2.

In step S154, the video signal processing section 331-2 integrates the signal (the SD signal) that is supplied from the video signal processing section 331-1 with the SD signal that was subjected to video signal processing in step S153, thereby obtaining an integrated signal, and supplies the integrated signal as an HD signal to the video signal processing section 331-3.

In step S144, the video signal processing section 331-3 integrates the signal (the HD signal) that is supplied from the video signal processing section 331-2 with the HD signal that was subjected to video signal processing in step S143, thereby obtaining an integrated signal, and supplies the integrated signal as an HDp signal to the video signal processing section 331-4.

In step S136, the video signal processing section 331-4 integrates the signal (the HDp signal) that is supplied from the video signal processing section 331-3 with the HDp signal that was subjected to video signal processing in step S135, thereby obtaining an integrated signal.

In step S137, the video signal processing section 331-4 outputs, as a 4K2K signal to the video display device 332, the signal that is integrated in step S136.

In step S138, the video display device 332 displays a video in accordance with the 4K2K signal.

According to the above-described process, video signal processing is performed on a 4K2K video input signal in accordance with the processing capabilities of the respective video signal processing sections 331-1 to 331-4, and a 4K2K video output signal can be output.

Thus, in the television receiver shown in FIG. 11, a 4K2K video output signal can be output for a 4K2K video input signal by using a combination of the video signal processing sections having the processing capabilities corresponding to an HDp signal, an HD signal, and an SD signal without providing a video signal processing section having a processing capability of 4K2K, and a video can be displayed in accordance with the 4K2K video output signal. As a result, even when it is necessary to increase the bandwidths of a video input signal and a video output signal, increasing of the bandwidths of a video input signal and a video output signal can be supported without discarding existing systems that do not have processing capabilities corresponding to the necessary bandwidths.

Furthermore, in the television receiver shown in FIG. 11, video signal processing in which increasing of the bandwidth of a video output signal is supported is performed as in the case of signal processing in which increasing of the bandwidth of an output signal is supported, which has been described with reference to the flowchart shown in FIG. 4.

Thus, in the television receiver shown in FIG. 11, the bandwidth of a video output signal can be increased to 4K2K by using a combination of the video signal processing sections having the processing capabilities corresponding to an HDp signal, an HD signal, and an SD signal without providing a video signal processing section having a processing capability of 4K2K. As a result, even when it is necessary to increase the bandwidth of a video output signal because, for example, only performance capability of the video display device 332 is improved, increasing of the bandwidth of a video output signal can be supported without discarding existing systems that do not have processing capabilities corresponding to the necessary bandwidths.

The television receiver according to the embodiment of the present invention has been described above. However, the above-described configuration can also be applied to, for example, a video processing system.

Figure 13:
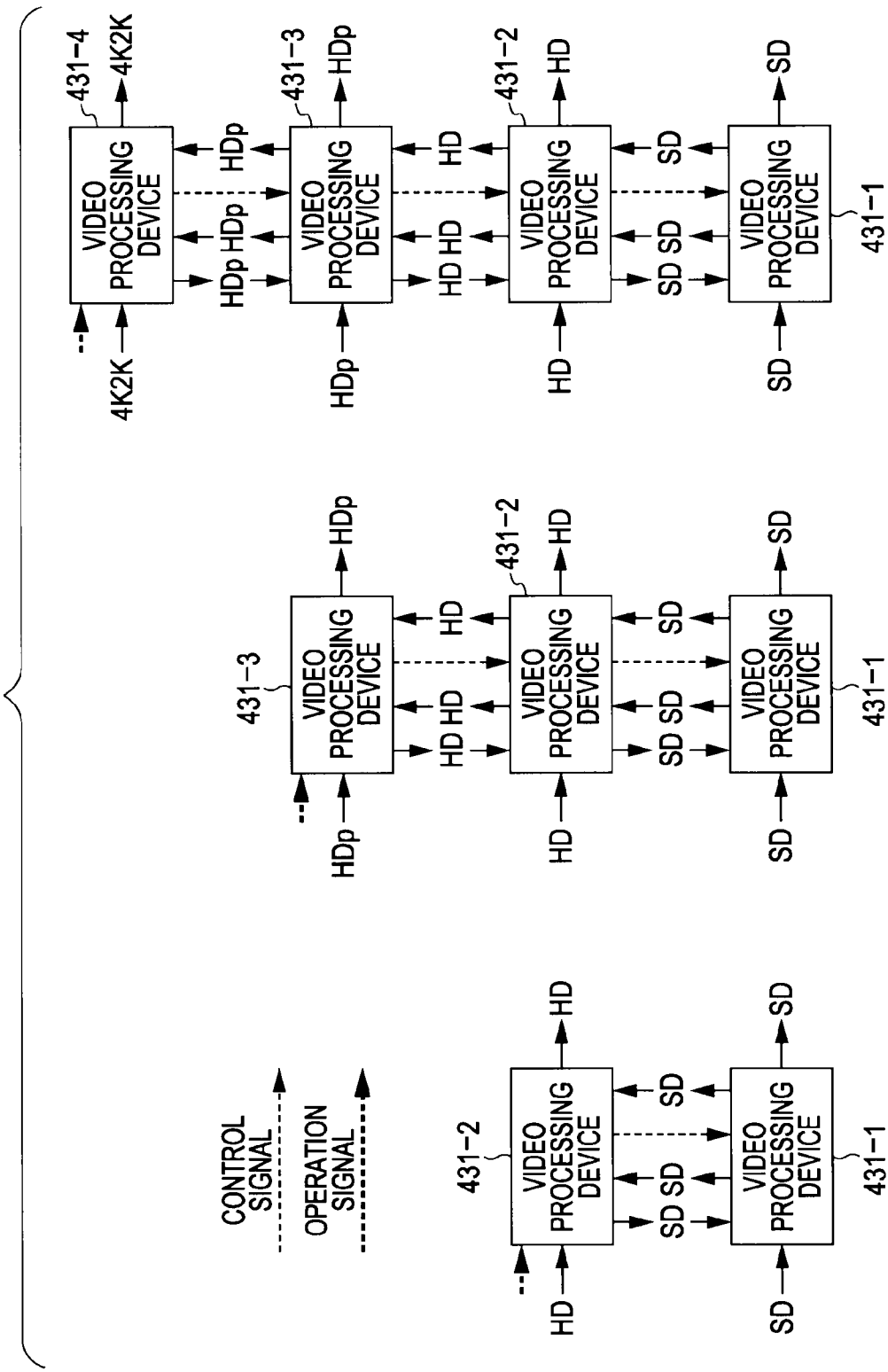
FIG. 13 is a diagram showing an example of a configuration of a video processing system according to an embodiment of the present invention.

FIG. 13 shows an example of a configuration of a video processing system according to an embodiment of the present invention.

In FIG. 13, the video processing system in three states is shown. The video processing system that is shown at the left in FIG. 13 is configured using video processing devices 431-1 and 431-2. The video processing system that is shown at the center in FIG. 13 is configured by adding a video processing device 431-3 to the video processing system that is shown at the left in FIG. 13. The video processing system that is shown at the right in FIG. 13 is configured by adding a video processing device 431-4 to the video processing system that is shown at the center in FIG. 13.

Referring to FIG. 13, the video processing device 431-1 can perform signal processing on an SD signal. When an SD signal is input, the video processing device 431-1 performs predetermined video signal processing on the signal in accordance with an operation signal (indicated by a thick broken line in FIG. 13) that is generated by performing a user operation, and outputs an SD signal.

The video processing device 431-2 can alone perform signal processing on an SD signal as in the case of the video processing device 431-1. When an SD signal is input, the video processing device 431-2 performs predetermined video signal processing on the signal in accordance with an operation signal that is generated by performing a user operation, and outputs an SD signal.

The video processing device 431-3 can alone perform signal processing on an HD signal. When an HD signal is input, the video processing device 431-3 performs predetermined video signal processing on the signal in accordance with an operation signal that is generated by performing a user operation, and outputs an HD signal.

The video processing device 431-4 can alone perform signal processing on an HDp signal. When an HDp signal is input, the video processing device 431-4 performs predetermined video signal processing on the signal in accordance with an operation signal that is generated by performing a user operation, and outputs an HDp signal.

Furthermore, the video processing devices 431-1 to 431-4 shown in FIG. 13 correspond to the signal processing devices 31-1 to 31-4 shown in FIG. 1 and the signal processing devices 131-1 to 131-4 shown in FIG. 5, respectively. In other words, the video processing system shown in FIG. 13 basically has functions that are obtained by combining functions of the signal processing system shown in FIG. 1 with functions of the signal processing system shown in FIG. 5 other than performance of processing on a video signal. That is, the video processing devices 431-1 to 431-4 basically have configurations that are similar to those of the signal processing devices 231-1 to 231-3 which have been described with reference to FIG. 10 other than processing of a video signal. Thus, descriptions of the video processing devices 431-1 to 431-4 are omitted.

Figure 14:
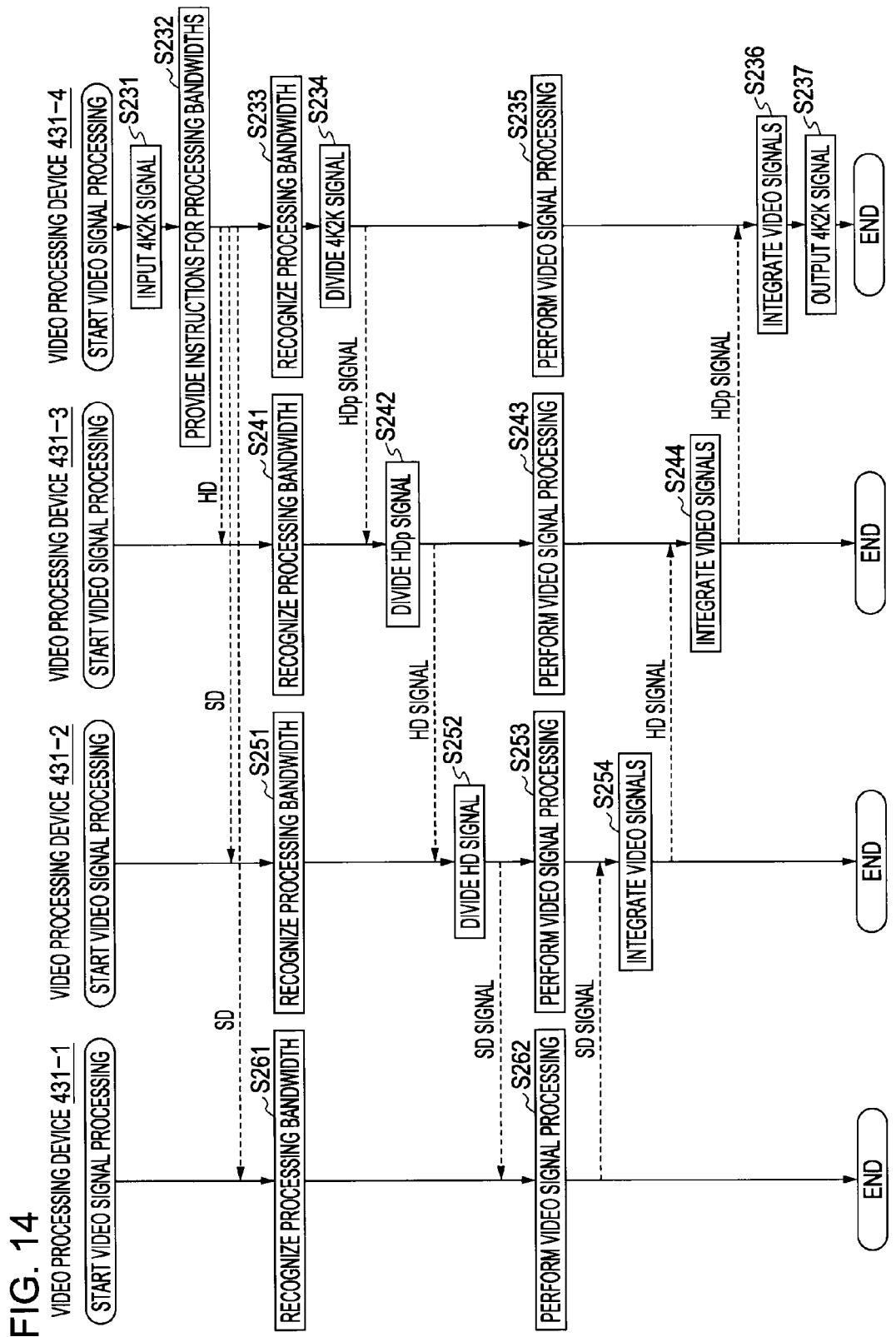
FIG. 14 is a flowchart for explaining video signal processing that is performed in the video processing system shown in FIG. 13.

Next, video signal processing in which increasing of the bandwidths of a video input signal and a video output signal is supported will be described with reference to a flowchart shown in FIG. 14 as an example of video signal processing that is performed in the video processing system shown in FIG. 13.

In step S231, the video processing device 431-4 inputs a 4K2K signal.

In step S232, the video processing device 431-4 determines, in accordance with the operation signal that indicates a user operation and in accordance with processing capabilities of the video processing devices 431-1 to 431-4 in the video processing system, processing bandwidths at which the video processing devices 431-1 to 431-4 are to perform signal processing in such a manner that the video processing devices 431-1 to 431-4 share signal processing. The video processing device 431-4 provides instructions for the determined processing bandwidths to the related sections. More specifically, the video processing device 431-4 determines that the video processing devices 431-1 to 431-4 are to perform signal processing on the input 4K2K signal at processing bandwidths which correspond to an SD signal, an SD signal, an HD signal, and an HDp signal, respectively. The video processing device 431-4 supplies control signals indicating the determined processing bandwidths to the video processing devices 431-1 to 431-4 including the video processing device 431-4.

In step S233, the video processing device 431-4 recognizes, in accordance with a corresponding one of the control signals, the processing bandwidth at which the video processing device 431-4 is to perform signal processing and which corresponds to an HDp signal.

In step S234, the video processing device 431-4 divides the 4K2K signal that is an input signal into signals having a bandwidth that corresponds to the recognized processing bandwidth corresponding to an HDp signal, thereby obtaining HDp signals. Additionally, the video processing device 431-4 supplies the remaining input signal having a bandwidth that corresponds to the processing bandwidth corresponding to an HDp signal, which is obtained by dividing the 4K2K signal that is an input signal, to the video processing device 431-3.

In step S235, the video processing device 431-4 performs predetermined video signal processing on the divided input signal (the HDp signal).

In step S241, the video processing device 431-3 recognizes, in accordance with a corresponding one of the control signals that are supplied from the video processing device 431-4, the processing bandwidth at which the video processing device 431-3 is to perform signal processing and which corresponds to an HD signal.

In step S242, the video processing device 431-3 divides the HDp signal that is supplied from the video processing device 431-4 and that is an input signal into signals having a bandwidth that corresponds to the recognized processing bandwidth corresponding to an HD signal, thereby obtaining HD signals. Additionally, the video processing device 431-3 supplies the remaining input signal having a bandwidth that corresponds to the processing bandwidth corresponding to an HD signal, which is obtained by dividing the HDp signal, to the video processing device 431-2.

In step S243, the video processing device 431-3 performs predetermined video signal processing on the divided input signal (the HD signal).

In step S251, the video processing device 431-2 recognizes, in accordance with a corresponding one of the control signals that are supplied from the video processing device 431-4, the processing bandwidth at which the video processing device 431-2 is to perform signal processing and which corresponds to an SD signal.

In step S252, the video processing device 431-2 divides the HD signal that is supplied from the video processing device 431-3 and that is an input signal into signals having a bandwidth that corresponds to the recognized processing bandwidth corresponding to an SD signal, thereby obtaining SD signals. Additionally, the video processing device 431-2 supplies the remaining input signal having a bandwidth that corresponds to the processing bandwidth corresponding to an SD signal, which is obtained by dividing the HD signal, to the video processing device 431-1.

In step S253, the video processing device 431-2 performs predetermined video signal processing on the divided input signal (the SD signal).

In step S261, the video processing device 431-1 recognizes, in accordance with a corresponding one of the control signals that are supplied from the video processing device 431-4, the processing bandwidth at which the video processing device 431-1 is to perform signal processing and which corresponds to an SD signal.

In step S262, the video processing device 431-1 performs predetermined video signal processing on the input signal (the SD signal) that is supplied from the video processing device 431-2. The video processing device 431-1 supplies a processing result of performance of predetermined video signal processing to the video processing device 431-2.

In step S254, the video processing device 431-2 integrates the signal (the SD signal) that is supplied from the video processing device 431-1 with the SD signal that was subjected to video signal processing in step S253, thereby obtaining an integrated signal, and supplies the integrated signal as an HD signal to the video processing device 431-3.

In step S244, the video processing device 431-3 integrates the signal (the HD signal) that is supplied from the video processing device 431-2 with the HD signal that was subjected to video signal processing in step S243, thereby obtaining an integrated signal, and supplies the integrated signal as an HDp signal to the video processing device 431-4.

In step S236, the video processing device 431-4 integrates the signal (the HDp signal) that is supplied from the video processing device 431-3 with the HDp signal that was subjected to video signal processing in step S235, thereby obtaining an integrated signal.

In step S237, the video processing device 431-4 outputs, as a 4K2K signal, the signal that is integrated in step S236.

According to the above-described process, video signal processing is performed on a 4K2K video input signal in accordance with the processing capabilities of the respective video processing devices 431-1 to 431-4, and a 4K2K video output signal can be output.

Thus, in the video processing system shown in FIG. 13, a 4K2K video output signal can be output for a 4K2K video input signal by using a combination of the video processing devices having the processing capabilities corresponding to an HDp signal, an HD signal, and an SD signal without providing a video processing device having a processing capability of 4K2K. As a result, even when it is necessary to increase the bandwidths of a video input signal and a video output signal, increasing of the bandwidths of a video input signal and a video output signal can be supported without discarding existing systems that do not have processing capabilities corresponding to the necessary bandwidths.

Furthermore, in the video processing system shown in FIG. 13, video signal processing in which increasing of the bandwidth of a video output signal is supported is performed as in the case of signal processing in which increasing of the bandwidth of an output signal is supported, which has been described with reference to the flowchart shown in FIG. 4.

Thus, in the video processing system shown in FIG. 13, the bandwidth of a video output signal can be increased to 4K2K by using a combination of the video processing devices having the processing capabilities corresponding to an HDp signal, an HD signal, and an SD signal without providing a video processing device having a processing capability of 4K2K. As a result, even when it is necessary to increase the bandwidth of a video output signal, increasing of the bandwidth of a video output signal can be supported without discarding existing systems that do not have processing capabilities corresponding to the necessary bandwidths.

The video processing system according to the embodiment of the present invention has been described above. However, the above-described configuration can also be applied to, for example, an audio processing system.

Figure 15:
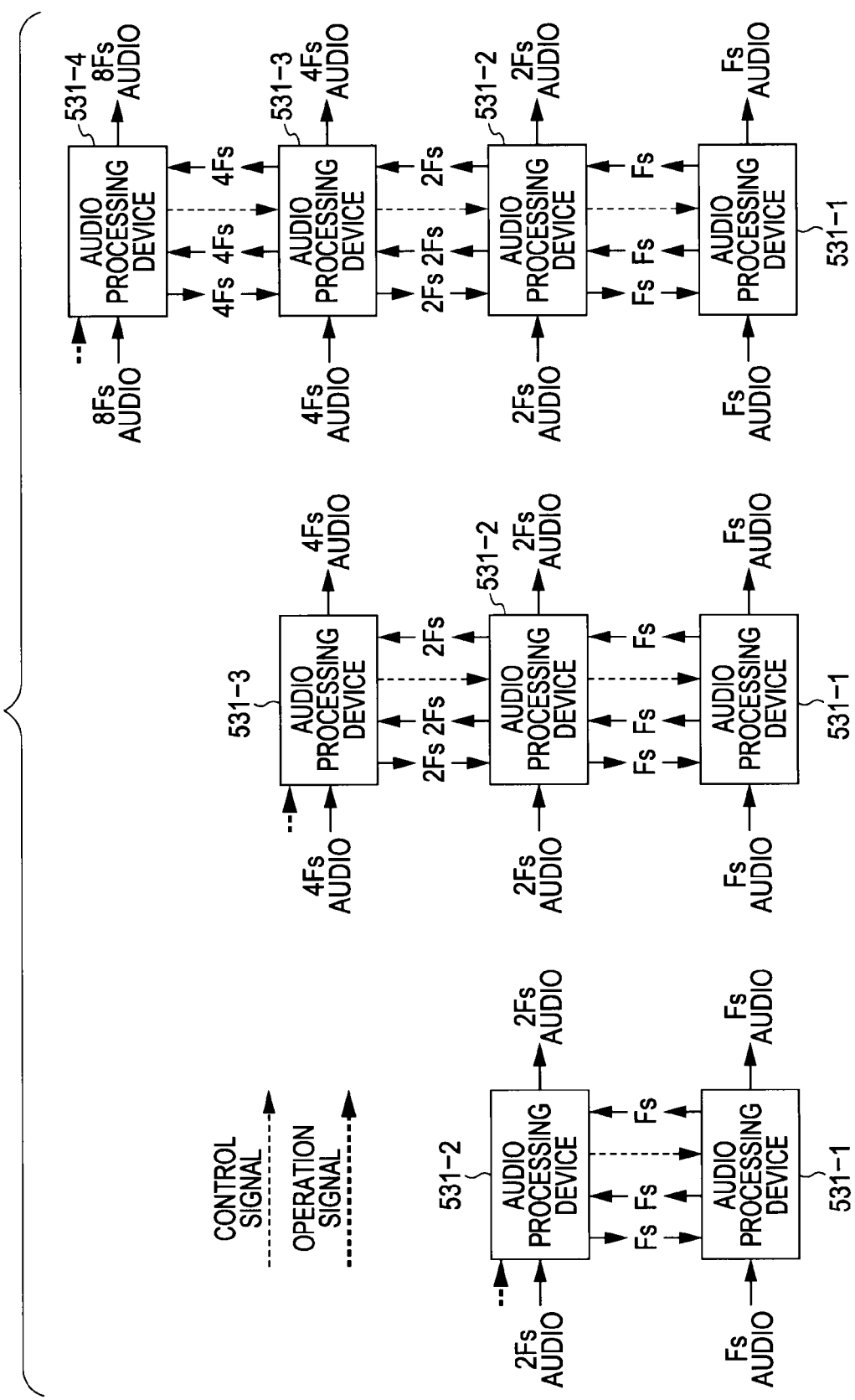
FIG. 15 is a diagram showing an example of a configuration of an audio processing system according to an embodiment of the present invention.

FIG. 15 shows an example of a configuration of an audio processing system according to an embodiment of the present invention.

In FIG. 15, the audio processing system in three states is shown. The audio processing system that is shown at the left in FIG. 15 is configured using audio processing devices 531-1 and 531-2. The audio processing system that is shown at the center in FIG. 15 is configured by adding an audio processing device 531-3 to the signal processing system that is shown at the left in FIG. 15. The audio processing system that is shown at the right in FIG. 15 is configured by adding an audio processing device 531-4 to the signal processing system that is shown at the center in FIG. 15.

Referring to FIG. 15, the audio processing device 531-1 can perform signal processing on an audio signal having a sampling frequency Fs. When an audio signal having the sampling frequency Fs is input, the audio processing device 531-1 performs predetermined audio signal processing on the signal in accordance with an operation signal (indicated by a thick broken line in FIG. 15) that is generated by performing a user operation, and outputs an audio signal having the sampling frequency Fs.

The audio processing device 531-2 can alone perform signal processing on an audio signal having the sampling frequency Fs as in the case of the audio processing device 531-1. When an audio signal having the sampling frequency Fs is input, the audio processing device 531-2 performs predetermined audio signal processing on the signal in accordance with an operation signal that is generated by performing a user operation, and outputs an audio signal having the sampling frequency Fs.

The audio processing device 531-3 can alone perform signal processing on an audio signal having a sampling frequency 2Fs. When an audio signal having the sampling frequency 2Fs is input, the audio processing device 531-3 performs predetermined audio signal processing on the signal in accordance with an operation signal that is generated by performing a user operation, and outputs an audio signal having the sampling frequency 2Fs.

The audio processing device 531-4 can alone perform signal processing on an audio signal having a sampling frequency 4Fs. When an audio signal having the sampling frequency 4Fs is input, the audio processing device 531-4 performs predetermined audio signal processing on the signal in accordance with an operation signal that is generated by performing a user operation, and outputs an audio signal having the sampling frequency 4Fs.

Furthermore, the audio processing devices 531-1 to 531-4 shown in FIG. 15 correspond to the signal processing devices 31-1 to 31-4 shown in FIG. 1 and the signal processing devices 131-1 to 131-4 shown in FIG. 5, respectively. In other words, the audio processing system shown in FIG. 15 basically has functions that are obtained by combining functions of the signal processing system shown in FIG. 1 with functions of the signal processing system shown in FIG. 5 other than performance of processing on an audio signal. That is, the audio processing devices 531-1 to 531-4 basically have configurations that are similar to those of the signal processing devices 231-1 to 231-3 which have been described with reference to FIG. 10 other than processing of an audio signal. Thus, descriptions of the audio processing devices 531-1 to 531-4 are omitted.

Figure 16:
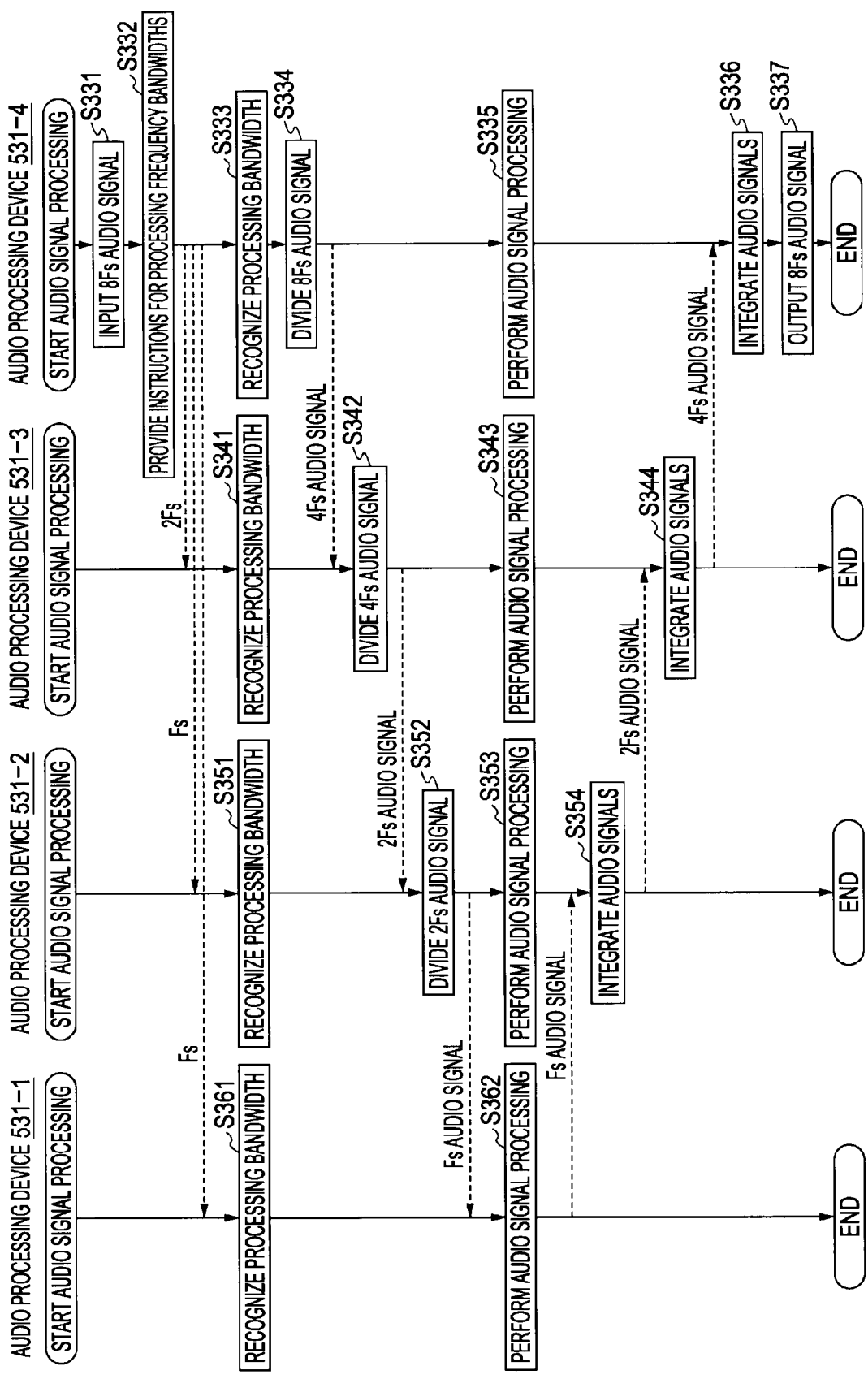
FIG. 16 is a flowchart for explaining audio signal processing that is performed in the audio processing system shown in FIG. 15.

Next, audio signal processing in which increasing of the bandwidths of an audio input signal and an audio output signal is supported will be described with reference to a flowchart shown in FIG. 16 as an example of audio signal processing that is performed in the audio processing system shown in FIG. 15.

In step S331, the audio processing device 531-4 inputs an audio signal having a sampling frequency 8Fs.

In step S332, the audio processing device 531-4 determines, in accordance with the operation signal that indicates a user operation and in accordance with processing capabilities of the audio processing devices 531-1 to 531-4 in the audio processing system, processing bandwidths at which the audio processing devices 531-1 to 531-4 are to perform signal processing in such a manner that the audio processing devices 531-1 to 531-4 share signal processing. The audio processing device 531-4 provides instructions for the determined processing bandwidths to the related sections. More specifically, the audio processing device 531-4 determines that the audio processing devices 531-1 to 531-4 are to perform signal processing on the input audio signal having the sampling frequency 8Fs at processing bandwidths of the sampling frequencies Fs, Fs, 2Fs, and 4Fs, respectively. The audio processing device 531-4 supplies control signals indicating the determined processing bandwidths to the audio processing devices 531-1 to 531-4 including the audio processing device 531-4.

In step S333, the audio processing device 531-4 recognizes, in accordance with a corresponding one of the control signals, the processing bandwidth of the sampling frequency 4Fs at which the audio processing device 531-4 is to perform signal processing.

In step S334, the audio processing device 531-4 divides the audio signal having the sampling frequency 8Fs that is an input signal into signals having a bandwidth that corresponds to the recognized processing bandwidth of the sampling frequency 4Fs, thereby obtaining audio signals having the sampling frequency 4Fs. Additionally, the audio processing device 531-4 supplies the remaining input signal having a bandwidth that corresponds to the processing bandwidth of the sampling frequency 4Fs, which is obtained by dividing the audio signal having the sampling frequency 8Fs that is an input signal, to the audio processing device 531-3.

In step S335, the audio processing device 531-4 performs predetermined audio signal processing on the divided input signal (the audio signal having the sampling frequency 4Fs).

In step S341, the audio processing device 531-3 recognizes, in accordance with a corresponding one of the control signals that are supplied from the audio processing device 531-4, the processing bandwidth of the sampling frequency 2Fs at which the audio processing device 531-3 is to perform signal processing.

In step S342, the audio processing device 531-3 divides the audio signal having the sampling frequency 4Fs that is supplied from the audio processing device 531-4 and that is an input signal into signals having a bandwidth that corresponds to the recognized processing bandwidth of the sampling frequency 2Fs, thereby obtaining audio signals having the sampling frequency 2Fs. Additionally, the audio processing device 531-3 supplies the remaining input signal having a bandwidth that corresponds to the processing bandwidth of the sampling frequency 2Fs, which is obtained by dividing the audio signal having the sampling frequency 4Fs, to the audio processing device 531-2.

In step S343, the audio processing device 531-3 performs predetermined audio signal processing on the divided input signal (the audio signal having the sampling frequency 2Fs).

In step S351, the audio processing device 531-2 recognizes, in accordance with a corresponding one of the control signals that are supplied from the audio processing device 531-4, the processing bandwidth of the sampling frequency Fs at which the audio processing device 531-2 is to perform signal processing.

In step S352, the audio processing device 531-2 divides the audio signal having the sampling frequency 2Fs that is supplied from the audio processing device 531-3 and that is an input signal into signals having a bandwidth that corresponds to the recognized processing bandwidth of the sampling frequency Fs, thereby obtaining audio signals having the sampling frequency Fs. Additionally, the audio processing device 531-2 supplies the remaining input signal having a bandwidth that corresponds to the processing bandwidth of the sampling frequency Fs, which is obtained by dividing the audio signal having the sampling frequency 2Fs, to the audio processing device 531-1.

In step S353, the audio processing device 531-2 performs predetermined audio signal processing on the divided input signal (the audio signal having the sampling frequency Fs).

In step S361, the audio processing device 531-1 recognizes, in accordance with a corresponding one of the control signals that are supplied from the audio processing device 531-4, the processing bandwidth of the sampling frequency Fs at which the audio processing device 531-1 is to perform signal processing.

In step S362, the audio processing device 531-1 performs predetermined audio signal processing on the input signal (the audio signal having the sampling frequency Fs) that is supplied from the audio processing device 531-2. The audio processing device 531-1 supplies a processing result of performance of predetermined audio signal processing to the audio processing device 531-2.

In step S354, the audio processing device 531-2 integrates the signal (the audio signal having the sampling frequency Fs) that is supplied from the audio processing device 531-1 with the audio signal having the sampling frequency Fs that was subjected to audio signal processing in step S353, thereby obtaining an integrated signal, and supplies the integrated signal as an audio signal having the sampling frequency 2Fs to the audio processing device 531-3.

In step S344, the audio processing device 531-3 integrates the signal (the audio signal having the sampling frequency 2Fs) that is supplied from the audio processing device 531-2 with the audio signal having the sampling frequency 2Fs that was subjected to audio signal processing in step S343, thereby obtaining an integrated signal, and supplies the integrated signal as an audio signal having the sampling frequency 4Fs to the audio processing device 531-4.

In step S336, the audio processing device 531-4 integrates the signal (the audio signal having the sampling frequency 4Fs) that is supplied from the audio processing device 531-3 with the audio signal having the sampling frequency 4Fs that was subjected to audio signal processing in step S335, thereby obtaining an integrated signal.

In step S337, the audio processing device 531-4 outputs, as an audio signal having the sampling frequency 8Fs, the signal that is integrated in step S336.

According to the above-described process, audio signal processing is performed on an audio input signal having the sampling frequency 8Fs in accordance with the processing capabilities of the respective audio processing devices 531-1 to 531-4, and an audio output signal having the sampling frequency 8Fs can be output.

Thus, in the audio processing system shown in FIG. 15, an audio output signal having the sampling frequency 8Fs can be output for an audio input signal having the sampling frequency 8Fs by using a combination of the audio processing devices having the processing capabilities of the sampling frequencies 4Fs, 2Fs, and Fs without providing an audio processing device having a processing capability of the sampling frequency 8Fs. As a result, even when it is necessary to increase the bandwidths of an audio input signal and an audio output signal, increasing of the bandwidths of an audio input signal and an audio output signal can be supported without discarding existing systems that do not have processing capabilities corresponding to the necessary bandwidths.

Furthermore, in the audio processing system shown in FIG. 15, audio signal processing in which increasing of the bandwidth of an audio output signal is supported is performed as in the case of signal processing in which increasing of the bandwidth of an output signal is supported, which has been described with reference to the flowchart shown in FIG. 4.

Thus, in the audio processing system shown in FIG. 15, the bandwidth of an audio output signal can be increased to the sampling frequency 8Fs by using a combination of the audio processing devices having the processing capabilities of the sampling frequencies 4Fs, 2Fs, and Fs without providing an audio processing device having a processing capability of the sampling frequency 8Fs. As a result, even when it is necessary to increase the bandwidth of an audio output signal, increasing of the bandwidth of an audio output signal can be supported without discarding existing systems that do not have processing capabilities corresponding to the necessary bandwidths.

The audio processing system according to the embodiment of the present invention has been described above. However, the above-described configuration can also be applied to, for example, a data processing system.

Figure 17:
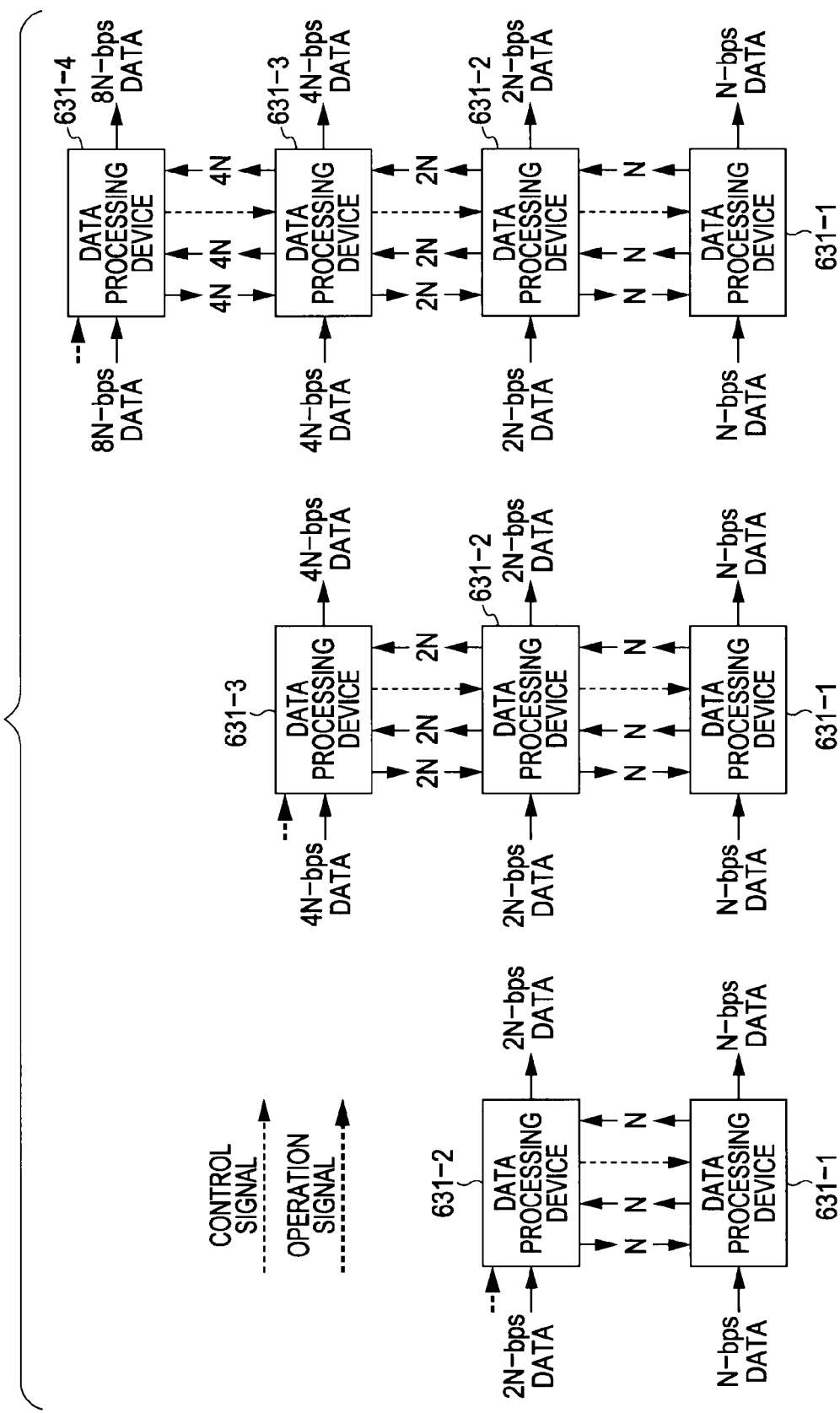
FIG. 17 is a diagram showing an example of a configuration of a data processing system according to an embodiment of the present invention.

FIG. 17 shows an example of a configuration of a data processing system according to an embodiment of the present invention.

In FIG. 17, the data processing system in three states is shown. The data processing system that is shown at the left in FIG. 17 is configured using data processing devices 631-1 and 631-2. The data processing system that is shown at the center in FIG. 17 is configured by adding a data processing device 631-3 to the data processing system that is shown at the left in FIG. 17. The data processing system that is shown at the right in FIG. 17 is configured by adding a data processing device 631-4 to the data processing system that is shown at the center in FIG. 17.

Referring to FIG. 17, the data processing device 631-1 can perform data processing on a data item having a data rate N (bit per second (bps)). When a data item having the data rate N (bps) is input, the data processing device 631-1 performs predetermined data processing on the data item in accordance with an operation signal (indicated by a thick broken line in FIG. 17) that is generated by performing a user operation, and outputs a data item having the data rate N (bps).

The data processing device 631-2 can alone perform data processing on a data item having the data rate N (bps) as in the case of the data processing device 631-1. When a data item having the data rate N (bps) is input, the data processing device 631-2 performs predetermined data processing on the data item in accordance with an operation signal that is generated by performing a user operation, and outputs a data item having the data rate N (bps).

The data processing device 631-3 can alone perform data processing on a data item having a data rate 2N (bps). When a data item having the data rate 2N (bps) is input, the data processing device 631-3 performs predetermined data processing on the data item in accordance with an operation signal that is generated by performing a user operation, and outputs a data item having the data rate 2N (bps).

The data processing device 631-4 can alone perform data processing on a data item having a data rate 4N (bps). When a data item having the data rate 4N (bps) is input, the data processing device 631-4 performs predetermined data processing on the data item in accordance with an operation signal that is generated by performing a user operation, and outputs a data item having the data rate 4N (bps).

Furthermore, the data processing devices 631-1 to 631-4 shown in FIG. 17 correspond to the signal processing devices 31-1 to 31-4 shown in FIG. 1 and the signal processing devices 131-1 to 131-4 shown in FIG. 5, respectively. In other words, the data processing system shown in FIG. 17 basically has functions that are obtained by combining functions of the signal processing system shown in FIG. 1 with functions of the signal processing system shown in FIG. 5 other than performance of processing on a data item. That is, the data processing devices 631-1 to 631-4 basically have configurations that are similar to those of the signal processing devices 231-1 to 231-3 which have been described with reference to FIG. 10 other than processing of a data item having a predetermined data rate instead of a signal having a predetermined format. Thus, descriptions of the data processing devices 631-1 to 631-4 are omitted.

Figure 18:
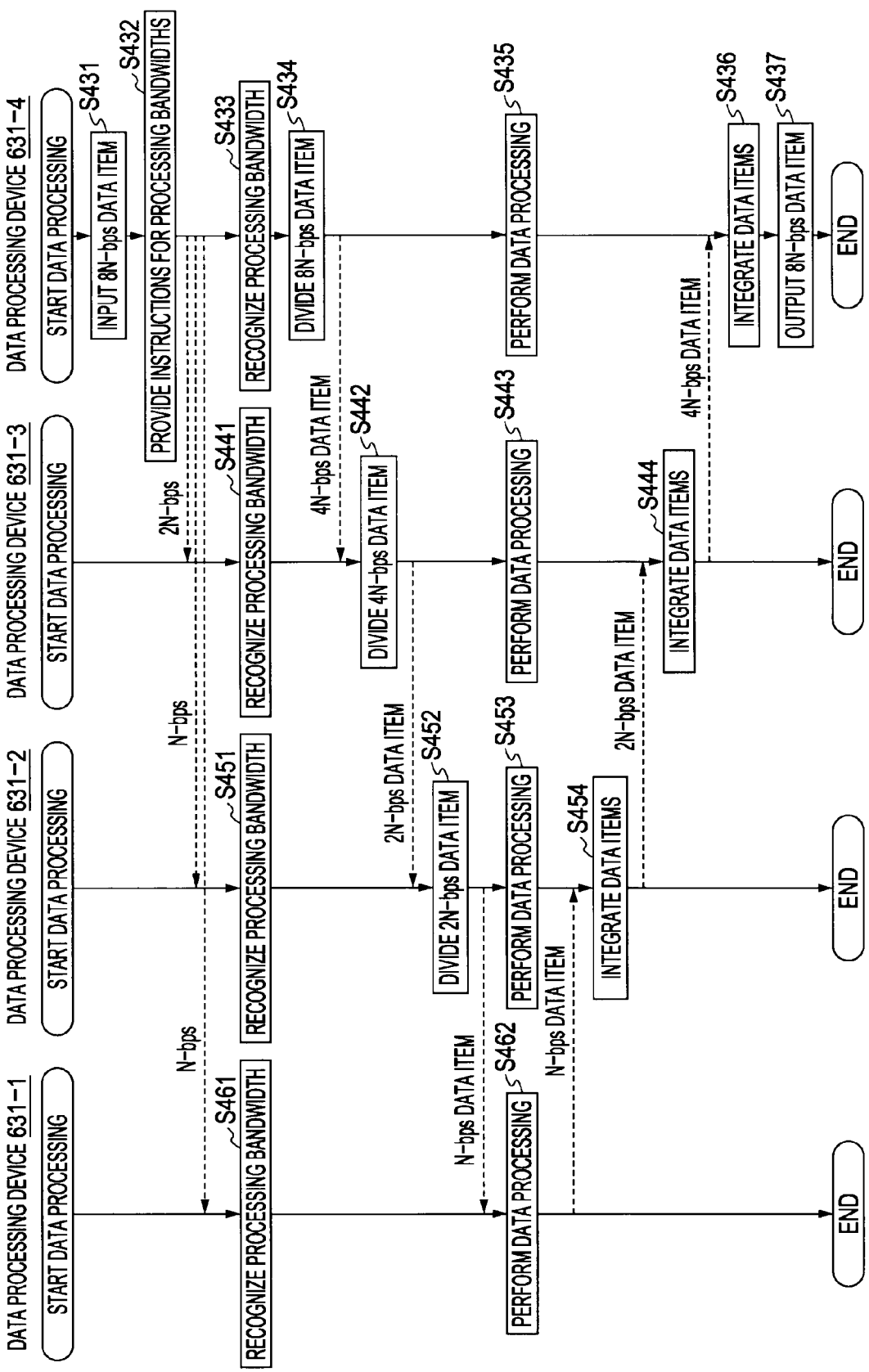
FIG. 18 is a flowchart for explaining data processing that is performed in the data processing system shown in FIG. 17.

Next, data processing in which increasing of the bandwidths of an input data item and an output data item is supported will be described with reference to a flowchart shown in FIG. 18 as an example of data processing that is performed in the data processing system shown in FIG. 17.

In step S431, the data processing device 631-4 inputs a data item having a data rate 8N (bps).

In step S432, the data processing device 631-4 determines, in accordance with the operation signal that indicates a user operation and in accordance with processing capabilities of the data processing devices 631-1 to 631-4 in the data processing system, processing bandwidths at which the data processing devices 631-1 to 631-4 are to perform data processing in such a manner that the data processing devices 631-1 to 631-4 share data processing. The data processing device 631-4 provides instructions for the determined processing bandwidths to the related sections. More specifically, the data processing device 631-4 determines that the data processing devices 631-1 to 631-4 are to perform data processing on the input data item having the data rate 8N (bps) at processing bandwidths of the data rates N, N, 2N, and 4N, respectively. The data processing device 631-4 supplies control signals indicating the determined processing bandwidths to the data processing devices 631-1 to 631-4 including the data processing device 631-4.

In step S433, the data processing device 631-4 recognizes, in accordance with a corresponding one of the control signals, the processing bandwidth of the data rate 4N at which the data processing device 631-4 is to perform data processing.

In step S434, the data processing device 631-4 divides the data item having the data rate 8N (bps) that is an input data item into data items having a bandwidth that corresponds to the recognized processing bandwidth of the data rate 4N, thereby obtaining data items having the data rate 4N (bps). Additionally, the data processing device 631-4 supplies the remaining input data item having a bandwidth that corresponds to the processing bandwidth of the data rate 4N, which is obtained by dividing the data item having the data rate 8N (bps) that is an input data item, to the data processing device 631-3.

In step S435, the data processing device 631-4 performs predetermined data processing on the divided input data item (the data item having the data rate 4N (bps)).

In step S441, the data processing device 631-3 recognizes, in accordance with a corresponding one of the control signals that are supplied from the data processing device 631-4, the processing bandwidth of the data rate 2N at which the data processing device 631-3 is to perform data processing.

In step S442, the data processing device 631-3 divides the data item having the data rate 4N (bps) that is supplied from the data processing device 631-4 and that is an input data item into data items having a bandwidth that corresponds to the recognized processing bandwidth of the data rate 2N, thereby obtaining data items having the data rate 2N (bps). Additionally, the data processing device 631-3 supplies the remaining input data item having a bandwidth that corresponds to the processing bandwidth of the data rate 2N, which is obtained by dividing the data item having the data rate 4N (bps), to the data processing device 631-2.

In step S443, the data processing device 631-3 performs predetermined data processing on the divided input data item (the data item having the data rate 2N (bps)).

In step S451, the data processing device 631-2 recognizes, in accordance with a corresponding one of the control signals that are supplied from the data processing device 631-4, the processing bandwidth of the data rate N at which the data processing device 631-2 is to perform data processing.

In step S452, the data processing device 631-2 divides the data item having the data rate 2N (bps) that is supplied from the data processing device 631-3 and that is an input data item into data items having a bandwidth that corresponds to the recognized processing bandwidth of the data rate N, thereby obtaining data items having the data rate N (bps). Additionally, the data processing device 631-2 supplies the remaining input data item having a bandwidth that corresponds to the processing bandwidth of the data rate N, which is obtained by dividing the data item having the data rate 2N (bps), to the data processing device 631-1.

In step S453, the data processing device 631-2 performs predetermined data processing on the divided input data item (the data item having the data rate N (bps)).

In step S461, the data processing device 631-1 recognizes, in accordance with a corresponding one of the control signals that are supplied from the data processing device 631-4, the processing bandwidth of the data rate N at which the data processing device 631-1 is to perform data processing.

In step S462, the data processing device 631-1 performs predetermined data processing on the input data item (the data item having the data rate N (bps)) that is supplied from the data processing device 631-2. The data processing device 631-1 supplies a processing result of performance of predetermined data processing to the data processing device 631-2.

In step S454, the data processing device 631-2 integrates the data item (the data item having the data rate N (bps)) that is supplied from the data processing device 631-1 with the data item having the data rate N (bps) that was subjected to data processing in step S453, thereby obtaining an integrated data item, and supplies the integrated data item as a data item having the data rate 2N (bps) to the data processing device 631-3.

In step S444, the data processing device 631-3 integrates the data item (the data item having the data rate 2N (bps)) that is supplied from the data processing device 631-2 with the data item having the data rate 2N (bps) that was subjected to data processing in step S443, thereby obtaining an integrated data item, and supplies the integrated data item as a data item having the data rate 4N (bps) to the data processing device 631-4.

In step S436, the data processing device 631-4 integrates the data item (the data item having the data rate 4N (bps)) that is supplied from the data processing device 631-3 with the data item having the data rate 4N (bps) that was subjected to data processing in step S435, thereby obtaining an integrated data item.

In step S437, the data processing device 631-4 outputs, as a data item having the data rate 8N (bps), the data item that is integrated in step S436.

According to the above-described process, data processing is performed on an input data item having the data rate 8N (bps) in accordance with the processing capabilities of the respective data processing devices 631-1 to 631-4, and an output data item having the data rate 8N (bps) can be output.

Thus, in the data processing system shown in FIG. 17, an output data item having the data rate 8N (bps) can be output for an input data item having the data rate 8N (bps) by using a combination of the data processing devices having the processing capabilities of the data rates 4N, 2N, and N without providing a data processing device having a processing capability of the data rate 8N (bps). As a result, even when it is necessary to increase the bandwidths of an input data item and an output data item, increasing of the bandwidths of an input data item and an output data item can be supported without discarding existing systems that do not have processing capabilities corresponding to the necessary bandwidths.

Furthermore, in the data processing system shown in FIG. 17, data processing in which increasing of the bandwidth of an output data item is supported is performed as in the case of signal processing in which increasing of the bandwidth of an output signal is supported, which has been described with reference to the flowchart shown in FIG. 4.

Thus, in the data processing system shown in FIG. 17, the bandwidth of an output data item can be increased to the data rate 8N (bps) by using a combination of the data processing devices having the processing capabilities of the data rates 4N, 2N, and N without providing a data processing device having a processing capability of the data rate 8N (bps). As a result, even when it is necessary to increase the bandwidth of an output data item, increasing of the bandwidth of output data item can be supported without discarding existing systems that do not have processing capabilities corresponding to the necessary bandwidths.

As described above, in the signal processing system including the signal processing devices that perform signal processing on an input signal which is input to any one of the signal processing devices in such a manner that the signal processing devices share signal processing, for example, the signal processing device 31-2 performs predetermined signal processing on a 1 B-bandwidth signal that is included in the input signal and that has a bandwidth corresponding to the processing capability (1 B) of the signal processing device 31-2. The signal processing device 31-1 performs predetermined signal processing on a 1 B-bandwidth signal that is included in the input signal and that has a bandwidth corresponding to the processing capability (1 B) of the signal processing device 31-1, thereby obtaining a signal. The signal processing device 31-2 integrates the signal with the 1 B-bandwidth signal on which the signal processing device 31-2 has performed signal processing, thereby an integrated signal, and outputs the integrated signal to the signal processing device 31-3. Thus, for example, by using a combination of the signal processing devices having the processing capabilities corresponding to bandwidths of 1 B and 2 B without providing a signal processing device having a processing capability corresponding to a bandwidth of 4 B, the bandwidth of an output signal can be increased to 4 B for an input signal having a bandwidth of 1 B, or an output signal having the bandwidth of 4 B can be output for an input signal having the bandwidth of 4 B. As a result, increasing of the bandwidth of a signal can be supported without discarding existing systems that do not have processing capabilities corresponding to necessary bandwidths.

The above-described series of processes can be performing using hardware, and can also be performed using software. When the series of processes is performed using software, a program including software is installed from a program recording medium into a computer which is embedded in dedicated hardware, or into, for example, a general-purpose personal computer that can perform various types of functions by installing various types of programs.

Figure 19:
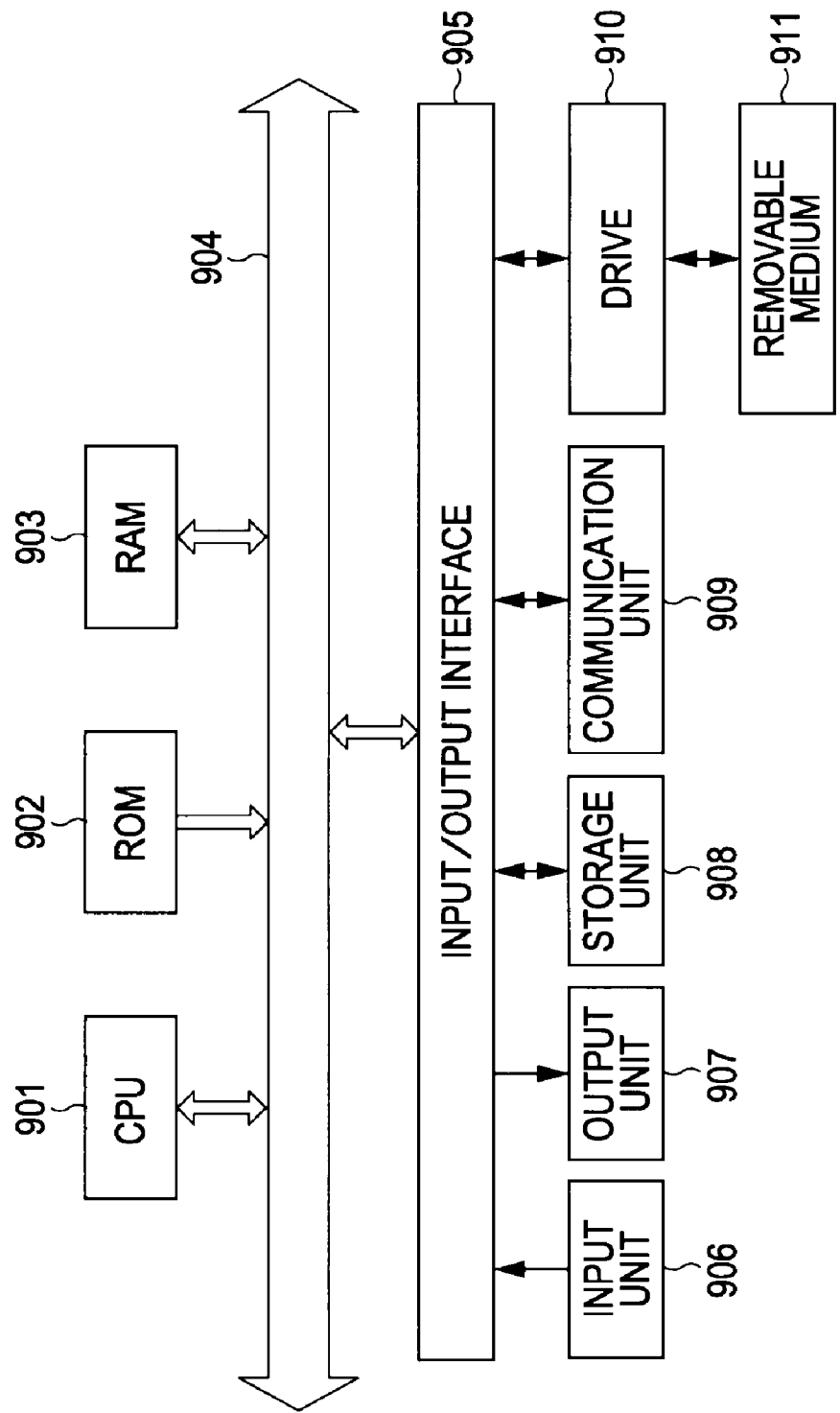
FIG. 19 is a block diagram showing an example of a hardware configuration of a computer that functions as a signal processing device according to an embodiment of the present invention.

FIG. 19 is a block diagram showing an example of a hardware configuration of a computer that performs the above-described series of processes by using a program.

In the computer, a central processing unit (CPU) 901, a read-only memory (ROM) 902, and a random-access memory (RAM) 903 are connected to each other via a bus 904.

An input/output interface 905 is further connected to the bus 904. An input unit 906, which is configured using a keyboard, a mouse, a microphone, or the like, an output unit 907, which is configured using a display, a speaker, or the like, a storage unit 908, which is configured using a hard disk, a nonvolatile memory, or the like, a communication unit 909, which is configured using a network interface, or the like, and a drive 910 that drives a removable medium 911 which is configured using a magnetic disc, an optical disc, a magneto-optical disc, a semiconductor memory, or the like are connected to the input/output interface 905.

In the computer having the above-mentioned configuration, the CPU 901, for example, loads a program that is stored in the storage unit 908 into the RAM 903 via the input/output interface 905 and the bus 904, and executes the program, thereby performing the above-described series of processes.

The program that is executed by the computer (the CPU 901) is, for example, recorded on the removable medium 911 that is a package medium which is configured using, a magnetic disc (including a flexible disc), an optical disc (a compact disc-read only memory (CD-ROM)), a digital versatile disc (DVD), a magneto-optical disc, a semiconductor memory, or the like. Alternatively, the program is supplied via a wire or wireless transmission medium such as a local area network, the Internet, or a digital satellite broadcasting.

The program can be installed into the storage unit 908 via the input/output interface 905 by mounting the removable medium 911 in the drive 910. Additionally, the program can be received by the communication unit 909 via a wire or wireless transmission medium, and be installed into the storage unit 908. Alternatively, the program can be installed into the ROM 902 or the storage unit 908 in advance.

The program that is executed by the computer may be a program with which processes are sequentially performed in the order that is described in this specification, or a program with which processes are performed in parallel or at necessary timing such as timing at which invocation is performed.

Furthermore, in this specification, the term "system" implies the entire apparatus including a plurality of devices.

The embodiments of the present invention are not limited to the above-described embodiments, and various modifications may be made without departing from the scope of the present invention.

The present application contains subject matter related to that disclosed in Japanese Priority Patent Application JP 2008-109266 filed in the Japan Patent Office on Apr. 18, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device configured to share signal processing of an input signal with a plurality of signal processing devices, the signal processing device comprising:
signal processing means for performing signal processing on a first-bandwidth signal included in the input signal and having a first bandwidth in accordance with a processing capability of the signal processing device to generate a first output signal; and
signal integration means for integrating a second output signal with the first output signal, thereby obtaining an integrated signal, and for outputting the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

2. The signal processing device according to claim 1, further comprising signal division means for dividing the input signal into the first-bandwidth signal and a fourth-bandwidth signal having a fourth bandwidth,
wherein the signal processing means generates the first output signal having the first bandwidth, and
wherein the signal integration means integrates a third output signal having the fourth bandwidth with the first output signal, thereby obtaining the integrated signal, and outputs the integrated signal to the second different signal processing device, the fourth-bandwidth signal being divided into the second-bandwidth signal and a fifth-bandwidth signal having a fifth bandwidth in the first different signal processing device, the third output signal being obtained by integrating the second output signal having the second bandwidth with the a fourth output signal having the fifth-bandwidth that is supplied from a third different signal processing device.

3. The signal processing device according to claim 2, wherein the signal division means divides a sixth-bandwidth signal having a sixth bandwidth into the first-bandwidth signal and the fourth-bandwidth signal, the sixth-bandwidth signal being obtained in the second different signal processing device by dividing the input signal.

4. The signal processing device according to claim 1, wherein the signal processing means generates a first amplified output signal by amplifying the first output signal in accordance with the processing capability of the signal processing device, and
wherein the signal integration means integrates a fourth output signal with the first amplified output signal that is amplified by the signal processing means, thereby obtaining the integrated signal, and outputs the integrated signal to the second different signal processing device, the fourth output signal being obtained by integrating a second amplified output signal with a third amplified output signal, the second amplified output signal being generated in the first different signal processing device by amplifying the second output signal in accordance with the processing capability of the first different signal processing device, the third amplified output signal being generated in a third different signal processing device by amplifying a third output signal in accordance with a processing capability of the third different signal processing device.

5. The signal processing device according to claim 1, further comprising instructing means for providing an instruction for the first bandwidth in signal processing that is involved in signal processing which is shared among the plurality of signal processing devices in accordance with processing capabilities of the plurality of signal processing devices, and that is performed by the signal processing means.

6. A signal processing method that is performed by a predetermined signal processing device configured to share signal processing of an input signal with a plurality of signal processing devices, the signal processing method comprising:
performing signal processing on a first-bandwidth signal included in the input signal and having a first bandwidth in accordance with a processing capability of the signal processing device to generate a first output signal;
integrating a second output signal with the first output signal, thereby obtaining an integrated signal and
outputting the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

7. A non-transitory computer-readable storage medium storing a program that causes a computer to perform a method of controlling a predetermined signal processing device to share signal processing of an input signal with a plurality of signal processing devices, the method comprising:
performing signal processing on a first-bandwidth signal included in the input signal and having a first bandwidth in accordance with a processing capability of the signal processing device to generate a first output signal;
integrating a second output signal with the first output signal, thereby obtaining an integrated signal; and
outputting the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

8. A signal processing system comprising:
a plurality of signal processing devices configured to perform signal processing on an input signal that is input to any one of the plurality of signal processing devices in such a manner that the plurality of signal processing devices share signal processing of the input signal, a predetermined signal processing device being a signal processing device among the plurality of signal processing devices in the signal processing system,
wherein the predetermined signal processing device includes
signal processing means for performing signal processing on a first-bandwidth signal included in the input signal and having a first bandwidth in accordance with a processing capability of the signal processing device to generate a first output signal, and
signal integration means for integrating a second output signal with the first output signal, thereby obtaining an integrated signal, and for outputting the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

9. The signal processing system according to claim 8,
wherein the predetermined signal processing device further includes signal division means for dividing the input signal into the first-bandwidth signal and a fourth-bandwidth signal having a fourth bandwidth,
wherein the signal processing means generates the first output signal having the first bandwidth, and
wherein the signal integration means integrates a third output signal having the fourth bandwidth with the first output signal, thereby obtaining the integrated signal, and outputs the integrated signal to the second different signal processing device, the fourth-bandwidth signal being divided into the second-bandwidth signal and a fifth-bandwidth signal having a fifth bandwidth in the first different signal processing device, the third output signal being obtained by integrating the second output signal having the second bandwidth with a fourth output signal having the fifth-bandwidth that is supplied from a third different signal processing device.

10. The signal processing system according to claim 8,
wherein the signal processing means generates a first amplified output signal by amplifying the first output signal in accordance with the processing capability of the signal processing device, and
wherein the signal integration means integrates a fourth output signal with the first amplified output signal that is amplified by the signal processing means, thereby obtaining the integrated signal, and outputs the integrated signal to the second different signal processing device, the fourth output signal being obtained by integrating a second amplified output signal with a third amplified output signal, the second amplified output signal being generated in the first different signal processing device by amplifying the second output signal in accordance with the processing capability of the first different signal processing device, the third amplified output signal being generated in a third different signal processing device by amplifying a third output signal in accordance with a processing capability of the third different signal processing device.

11. A signal processing device configured to share signal processing of an input signal with a plurality of signal processing devices, the signal processing device comprising:
a signal processing section configured to perform signal processing on a first-bandwidth signal included in the input signal and having a first bandwidth in accordance with a processing capability of the signal processing device to generate a first output signal; and
a signal integration section configured to integrate a second output signal with the first output signal, thereby obtaining an integrated signal, and configured to output the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

12. A signal processing system comprising:
a plurality of signal processing devices configured to perform signal processing on an input signal that is input to any one of the plurality of signal processing devices in such a manner that the plurality of signal processing devices share signal processing of the input signal, a predetermined signal processing device being a signal processing device among the plurality of signal processing devices in the signal processing system,
wherein the predetermined signal processing device includes
a signal processing section configured to perform signal processing on a first-bandwidth signal included in the input signal and having a first bandwidth in accordance with a processing capability of the signal processing device to generate a first output signal, and
a signal integration section configured to integrate the first output signal with a second output signal, thereby obtaining an integrated signal, and configured to output the integrated signal to a second different signal processing device that is configured to perform signal processing on a third-bandwidth signal included in the input signal and having a third bandwidth in accordance with a processing capability of the second different signal processing device, the second output signal being generated in a first different signal processing device by performing signal processing on a second-bandwidth signal included in the input signal and having a second bandwidth in accordance with a processing capability of the first different signal processing device.

13. The signal processing device according to claim 1, wherein the first-bandwidth signal, second-bandwidth signal, and third-bandwidth signal correspond to different non-overlapping portions of the input signal.

\* \* \* \* \*